United States Patent
Eoh et al.

(10) Patent No.: US 11,554,495 B2
(45) Date of Patent: Jan. 17, 2023

(54) METHOD OF LOCALIZATION USING MULTI SENSOR AND ROBOT IMPLEMENTING SAME

(71) Applicant: LG ELECTRONICS INC., Seoul (KR)

(72) Inventors: Gyuho Eoh, Seoul (KR); Jungsik Kim, Seoul (KR); Hyoungrock Kim, Seoul (KR); Dong Ki Noh, Seoul (KR); Joongtae Park, Seoul (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 16/766,274

(22) PCT Filed: May 30, 2019

(86) PCT No.: PCT/KR2019/006524
§ 371 (c)(1),
(2) Date: May 21, 2020

(87) PCT Pub. No.: WO2020/241930
PCT Pub. Date: Dec. 3, 2020

(65) Prior Publication Data
US 2020/0376676 A1  Dec. 3, 2020

(51) Int. Cl.
*B25J 9/16* (2006.01)
*B25J 13/08* (2006.01)
(Continued)

(52) U.S. Cl.
CPC ........... *B25J 9/1697* (2013.01); *B25J 9/10* (2013.01); *B25J 9/161* (2013.01); *B25J 9/1653* (2013.01);
(Continued)

(58) Field of Classification Search
CPC ... B25J 9/1697; B25J 9/10; B25J 9/161; B25J 9/1653; B25J 9/1679; B25J 13/089; B25J 11/0085
See application file for complete search history.

(56) References Cited

U.S. PATENT DOCUMENTS 9,870,624 B1 * 1/2018 Narang .................... G06T 7/74
10,776,948 B1 * 9/2020 Parisotto .............. G01C 21/005
(Continued)

FOREIGN PATENT DOCUMENTS

KR  20150144729  12/2015
KR  1020180044486  5/2018
(Continued)

OTHER PUBLICATIONS

I. Z. Ibragimov and I. M. Afanasyev, "Comparison of ROS-based visual SLAM methods in homogeneous indoor environment," 2017 14th Workshop on Positioning, Navigation and Communications (WPNC), 2017, pp. 1-6, doi: 10.1109/WPNC.2017.8250081. (Year: 2017).*

(Continued)

*Primary Examiner* — Jeff A Burke
*Assistant Examiner* — Hushmeen J Khan
(74) *Attorney, Agent, or Firm* — Lee, Hong, Degerman, Kang & Waimey PC

(57) ABSTRACT

Disclosed herein are a method of localization using multi sensors and a robot implementing the same, the method including sensing a distance between an object placed outside of a robot and the robot and generating a first LiDAR frame by a LiDAR sensor of the robot while a moving unit moves the robot, capturing an image of an object placed outside of the robot and generating a first visual frame by a camera sensor of the robot, and comparing a LiDAR frame stored in a map storage of the robot with the first LiDAR (Continued)

frame, comparing a visual frame registered in a frame node of a pose graph with the first visual frame, determining accuracy of comparison's results of the first LiDAR frame, and calculating a current position of the robot by a controller.

20 Claims, 15 Drawing Sheets

(51) Int. Cl.
  B25J 9/10 (2006.01)
  B25J 11/00 (2006.01)
(52) U.S. Cl.
  CPC ........... B25J 9/1679 (2013.01); B25J 13/089 (2013.01); B25J 11/0085 (2013.01)

(56) References Cited

U.S. PATENT DOCUMENTS

| | | | |
|---|---|---|---|
| 11,092,690 | B1* | 8/2021 | Meier ..................... G01S 17/89 |
| 2016/0082597 | A1 | 3/2016 | Gorshechnikov et al. |
| 2016/0209846 | A1* | 7/2016 | Eustice ................ G05D 1/0248 |
| 2017/0153646 | A1 | 6/2017 | Shin et al. |
| 2017/0329333 | A1 | 11/2017 | Passot et al. |
| 2018/0149753 | A1 | 5/2018 | Shin et al. |
| 2018/0204338 | A1 | 7/2018 | Narang et al. |
| 2018/0211399 | A1* | 7/2018 | Lee ......................... G06T 7/579 |
| 2019/0086539 | A1 | 3/2019 | Shin et al. |
| 2019/0171210 | A1 | 6/2019 | Passot et al. |
| 2019/0353758 | A1 | 11/2019 | Shin et al. |
| 2020/0254931 | A1* | 8/2020 | Herman ............... H04N 5/2624 |

FOREIGN PATENT DOCUMENTS

| | | |
|---|---|---|
| KR | 1020180117879 | 10/2018 |
| KR | 20190030197 | 3/2019 |
| KR | 1020190045006 | 5/2019 |

OTHER PUBLICATIONS

L. Wang, J. Wang, X. Wang and Y. Zhang, "3D-LIDAR based branch estimation and intersection location for autonomous vehicles," 2017 IEEE Intelligent Vehicles Symposium (IV), 2017, pp. 1440-1445, doi: 10.1109/IVS.2017.7995912. (Year: 2017).*

Y. Xu, Y. Ou and T. Xu, "SLAM of Robot based on the Fusion of Vision and LIDAR," 2018 IEEE International Conference on Cyborg and Bionic Systems (CBS), 2018, pp. 121-126, doi: 10.1109/CBS.2018.8612212. (Year: 2018).*

Korean Intellectual Property Office Application No. 10-2019-7023486, Notice of Allowance dated Nov. 26, 2020, 5 pages.

* cited by examiner

METHOD OF LOCALIZATION USING MULTI SENSOR AND ROBOT IMPLEMENTING SAME

CROSS-REFERENCE TO RELATED APPLICATIONS

This application is the National Stage filing under 35 U.S.C. 371 of International Application No. PCT/KR2019/006524, filed on May 30, 2019, the contents of which are all hereby incorporated by reference herein in their entirety.

TECHNICAL FIELD

The present disclosure relates to a method of localization using multi sensors and a robot moving using the same.

BACKGROUND

A large-scale retail store, a department store, an airport, a golf course, and the like are places where exchange of goods and services takes place between people. Robots may be useful in the places to offer information or convenience to people.

Robots may be classified as guide robots, security robots, cleaning robots and the like. The robots move in a space, confirming their positions.

The robots are required to hold information on a space, on their current positions, or on a path previously moved by the robots and the like such that the robots move confirming their positions and avoiding obstacles.

The robots may store maps to confirm a space and to move in the space. To generate a map, the robots may draw up a map using a variety of sensors, and may match and store various pieces of information in the map.

Additionally, after the robots store a map, comparison between information of the map and information acquired by the robots during movement of the robots is required to localize the robots using the map. That is, the robots may perform localization in which a position of a robot is estimated as a result of comparison between the information of the map and the information acquired by the robots during movement of the robots.

Enhanced accuracy of localization of a robot requires an increase in the number of sensors and an increase in the number of pieces of information of maps corresponding to the number of sensors, and technologies, in which a robot is localized using this are required.

DISCLOSURE

Technical Problems

The present disclosure enables a robot to perform localization on the basis of various types of sensors.

Additionally, the present disclosure enables a robot to calculate candidate positions of the robot on the basis of information generated by each sensor and to estimate a final position of the robot using the candidate positions.

Further, the present disclosure enables a robot to enhance accuracy of localization using another sensor when any one of sensors of the robot has low accuracy or when a plurality of positions are detected in response to information acquired by any one of the sensors.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

A robot performing localization using multi sensors and artificial intelligence according to an embodiment may include a LiDAR sensor sensing a distance between an object placed outside of the robot and the robot and generating a LiDAR frame, and a camera sensor capturing an image of an object placed outside of the robot and generating a visual frame.

The robot performing localization using multi sensors and artificial intelligence according to an embodiment may include a controller comparing a LiDAR frame stored in a map storage with a LiDAR frame calculated by the LiDAR sensor, comparing a visual frame stored in the map storage with a visual frame calculated by the camera sensor, and calculating a current position of the robot by determining accuracy of position information based on the LiDAR sensor.

The robot performing localization using multi sensors and artificial intelligence according to an embodiment may calculate a current position of the robot using odometry information.

The controller of the robot performing localization using multi sensors and artificial intelligence according to an embodiment may extract a second LiDAR frame and a third LiDAR frame similar to a first LiDAR frame calculated by the LiDAR sensor from the map storage, and may extract a second visual frame similar to a first visual frame calculated by the camera sensor from the map storage.

The controller of the robot performing localization using multi sensors and artificial intelligence according to an embodiment may select any one of the second LiDAR frame or the third LiDAR frame extracted from the map storage using the second visual frame extracted from the map storage and may calculate a current position of the robot using the selected LiDAR frame.

The controller of the robot performing localization using multi sensors and artificial intelligence according to an embodiment may store the first LiDAR frame calculated by the LiDAR sensor in the map storage in response to position information of the second visual frame when a similarity between the first visual frame and the second visual frame calculated by the camera sensor is higher than a predetermined reference value.

A method of localization using multi sensors and artificial intelligence according to an embodiment may include sensing a distance between an object placed outside of a robot and the robot and generating a first LiDAR frame by a LiDAR sensor of the robot while a moving unit moves the robot, capturing an image of an object placed outside of the robot and generating a first visual frame by a camera sensor of the robot, comparing a LiDAR frame stored in a map storage of the robot with the first LiDAR frame, comparing a visual frame registered in a frame node of a pose graph with the first visual frame, and calculating a current position of the robot by a controller by determining accuracy of comparison's results of the first LiDAR frame.

Advantageous Effects

According to embodiments of the present disclosure, a robot may estimate its position on the basis of various types of sensors.

According to embodiments of the present disclosure, a robot may calculate candidate positions of the robot on the basis of information generated by each sensor and may estimate a final position of the robot using the candidate positions.

According to embodiments of the present disclosure, a robot may enhance accuracy of localization using another sensor when any one of sensors of the robot has low accuracy or when a plurality of positions are detected in response to information acquired by any one of the sensors.

Effects of the present disclosure are not limited to the above-described ones, and one having ordinary skill in the art to which the disclosure pertains may easily draw various effects from the configuration of the disclosure.

DETAILED DESCRIPTION

Figure 1:
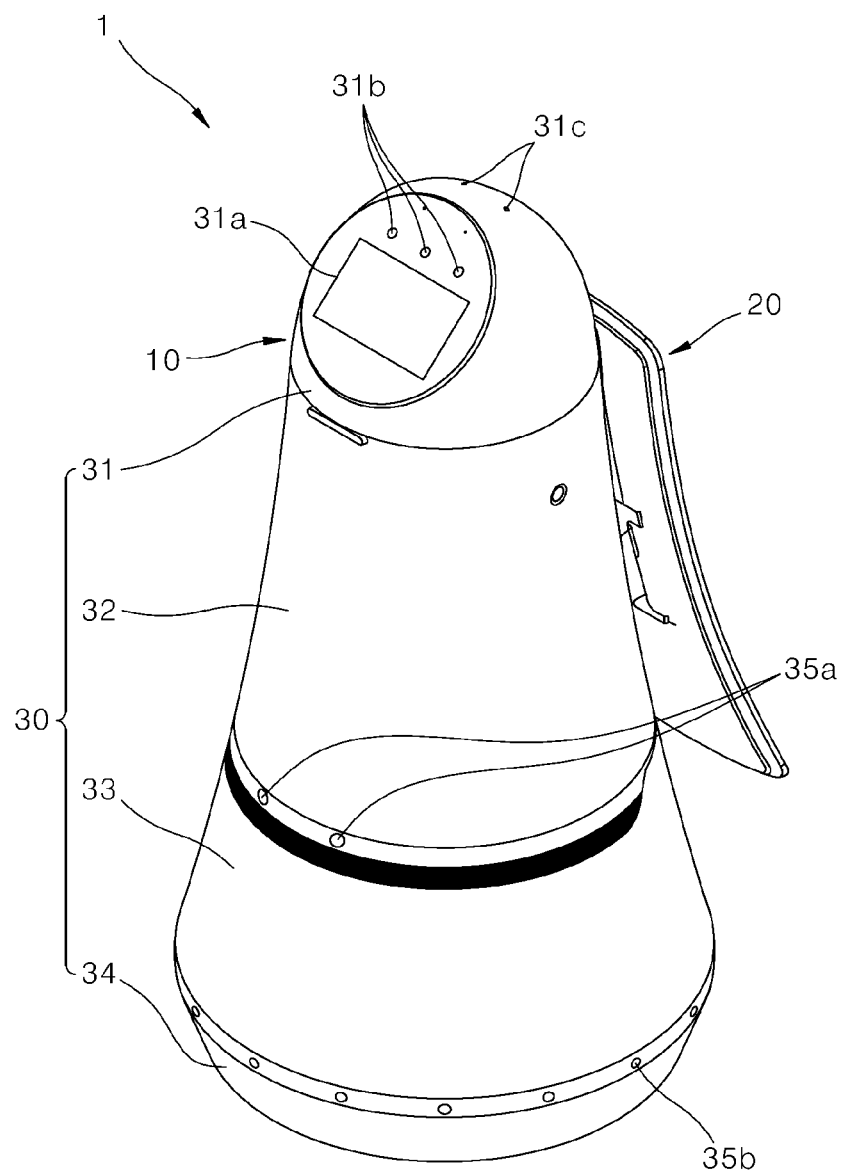
FIG. 1 shows an appearance of a robot according to an embodiment.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), (b), and the like. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, a robot includes devices that are used for specific purposes (cleaning, ensuring security, monitoring, guiding and the like) or that moves offering functions according to features of a space in which the robot is moving, hereunder. Accordingly, in this specification, devices that have transportation means capable of moving using predetermined information and sensors, and that offer predetermined functions are generally referred to as a robot.

In this specification, a robot may move with a map stored in it. The map denotes information on fixed objects such as fixed walls, fixed stairs and the like that do not move in a space. Additionally, information on movable obstacles that are disposed periodically, i.e., information on dynamic objects may be stored on the map.

As an example, information on obstacles disposed within a certain range with respect to a direction in which the robot moves forward may also be stored in the map. In this case, unlike the map in which the above-described fixed objects are stored, the map includes information on obstacles, which is registered temporarily, and then removes the information after the robot moves.

Further, in this specification, the robot may confirm an external dynamic object using various sensors. When the robot moves to a destination in an environment that is crowded with a large number of pedestrians after confirming the external dynamic object, the robot may confirm a state in which waypoints to the destination are occupied by obstacles.

Furthermore, the robot may determine the robot arrives at a waypoint on the basis of a degree in a change of directions of the waypoint, and the robot moves to the next waypoint and the robot can move to destination successfully.

FIG. 1 shows an appearance of a robot according to an embodiment. FIG. 1 shows an exemplary appearance. The robot may be implemented as robots having various appearances in addition to the appearance of FIG. 1. Specifically, each component may be disposed in different positions in the upward, downward, leftward and rightward directions on the basis of the shape of a robot.

A main body 10 may be configured to be long in the up-down direction, and may have the shape of a roly poly toy that gradually becomes slimmer from the lower portion toward the upper portion, as a whole.

The main body 10 may include a case 30 that forms the appearance of the robot 1. The case 30 may include a top cover 31 disposed on the upper side, a first middle cover 32 disposed on the lower side of the top cover 31, a second middle cover 33 disposed on the lower side of the first middle cover 32, and a bottom cover 34 disposed on the lower side of the second middle cover 33. The first middle cover 32 and the second middle cover 33 may constitute a single middle cover.

The top cover 31 may be disposed at the uppermost end of the robot 1, and may have the shape of a hemisphere or a dome. The top cover 31 may be disposed at a height below the average height for adults to readily receive an instruction from a user. Additionally, the top cover 31 may be configured to rotate at a predetermined angle.

The robot 1 may further include a control module 150 therein. The control module 150 controls the robot 1 like a type of computer or a type of processor. Accordingly, the control module 150 may be disposed in the robot 1, may perform functions similar to those of a main processor, and may interact with a user.

The control module 150 is disposed in the robot 1 to control the robot during the robot's movement by sensing objects around the robot. The control module 150 of the robot may be implemented as a software module, a chip in which a software module is implemented as hardware, and the like.

A display unit 31a that receives an instruction from a user or that outputs information, and sensors, for example, a camera 31b and a microphone 31c may be disposed on one side of the front surface of the top cover 31.

In addition to the display unit 31a of the top cover 31, a display unit 20 is also disposed on one side of the middle cover 32.

Information may be output by all the two display units 31a, 20 or may be output by any one of the two display units 31a, 20 according to functions of the robot.

Additionally, various obstacle sensors (220 in FIG. 2) are disposed on one lateral surface or in the entire lower end portion of the robot 1 like 35a, 35b. As an example, the obstacle sensors include a time-of-flight (TOF) sensor, an ultrasonic sensor, an infrared sensor, a depth sensor, a laser sensor, and a LiDAR sensor and the like. The sensors sense an obstacle outside of the robot 1 in various ways.

Additionally, the robot in FIG. 1 further includes a moving unit that is a component moving the robot in the lower end portion of the robot. The moving unit is a component that moves the robot, like wheels.

The shape of the robot in FIG. 1 is provided as an example. The present disclosure is not limited to the example. Additionally, various cameras and sensors of the robot may also be disposed in various portions of the robot 1. As an example, the robot of FIG. 1 may be a guide robot that gives information to a user and moves to a specific spot to guide a user.

The Robot in FIG. 1 may also include a robot that offers cleaning services, security services or functions. The robot may perform a variety of functions. However, in this specification, the focus is on a guide robot for convenience of description.

In a state in which a plurality of the robots in FIG. 1 are disposed in a service space, the robots perform specific functions (guide services, cleaning services, security services and the like). In the process, the robot 1 may store information on its position, may confirm its current position in the entire space, and may generate a path required for moving to a destination.

Figure 2:
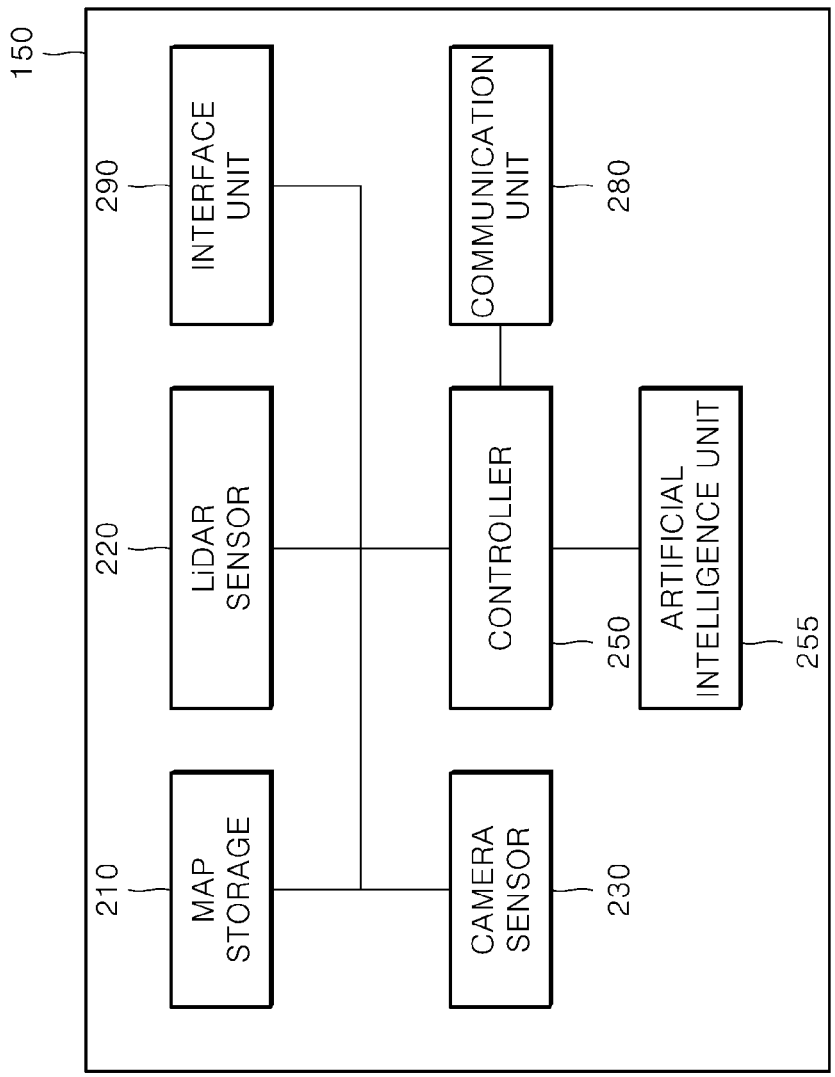
FIG. 2 shows components of a control module of a robot according to an embodiment.

FIG. 2 shows components of a control module of a robot according to an embodiment.

The robot may perform both of the functions of generating a map and estimating a position of the robot using the map.

Alternately, the robot may only offer the function of generating a map.

Alternately, the robot may only offer the function of estimating a position of the robot using the map. Below, the robot of the present disclosure usually offers the function of estimating a position of the robot using the map. Additionally, the robot may offer the function of generating a map or modifying a map.

A LiDAR sensor 220 may sense surrounding objects two-dimensionally or three-dimensionally. A two-dimensional LiDAR sensor may sense positions of objects within 360-degree ranges with respect to the robot. LiDAR information sensed in a specific position may constitute a single LiDAR frame. That is, the LiDAR sensor 220 senses a distance between an object disposed outside the robot and the robot to generate a LiDAR frame.

As an example, a camera sensor 230 is a regular camera. To overcome viewing angel limitations, two or more camera sensors 230 may be used. An image captured in a specific position constitutes vision information. That is, the camera sensor 230 photographs an object outside the robot and generates a visual frame including vision information.

The robot 1, to which the present disclosure is applied, performs fusion-simultaneous localization and mapping (Fusion-SLAM) using the LiDAR sensor 220 and the camera sensor 230.

In fusion SLAM, LiDAR information and vision information may be combinedly used. The LiDAR information and vision information may be configured as maps.

Unlike a robot that uses a single sensor (LiDAR-only SLAM, visual-only SLAM), a robot that uses fusion-SLAM may enhance accuracy of estimating a position. That is, when fusion SLAM is performed by combining the LiDAR information and vision information, map quality may be enhanced.

The map quality is a criterion applied to both of the vision map comprised of pieces of vision information, and the LiDAR map comprised of pieces of LiDAR information. At the time of fusion SLAM, map quality of each of the vision map and LiDAR map is enhanced because sensors may share information that is not sufficiently acquired by each of the sensors.

Additionally, LiDAR information or vision information may be extracted from a single map and may be used. For example, LiDAR information or vision information, or all the LiDAR information and vision information may be used for localization of the robot in accordance with an amount of memory held by the robot or a calculation capability of a calculation processor, and the like.

An interface unit 290 receives information input by a user. The interface unit 290 receives various pieces of information such as a touch, a voice and the like input by the user, and outputs results of the input. Additionally, the interface unit 290 may output a map stored by the robot 1 or may output a course in which the robot moves by overlapping on the map.

Further, the interface unit 290 may supply predetermined information to a user.

A controller 250 generates a map as in FIG. 4 that is described below, and on the basis of the map, estimates a position of the robot in the process in which the robot moves.

A communication unit 280 may allow the robot 1 to communicate with another robot or an external server and to receive and transmit information.

The robot 1 may generate each map using each of the sensors (a LiDAR sensor and a camera sensor), or may generate a single map using each of the sensors and then may generate another map in which details corresponding to a specific sensor are only extracted from the single map.

Additionally, the map of the present disclosure may include odometry information on the basis of rotations of wheels. The odometry information is information on distances moved by the robot, which are calculated using frequencies of rotations of a wheel of the robot, or a difference in frequencies of rotations of both wheels of the robot, and the like. The robot may calculate a distance moved by the robot on the basis of the odometry information as well as the information generated using the sensors.

The controller 250 in FIG. 2 may further include an artificial intelligence unit 255 for artificial intelligence work and processing.

A plurality of LiDAR sensors 220 and camera sensors 230 may be disposed outside of the robot 1 to identify external objects.

In addition to the LiDAR sensor 220 and camera sensor 230 in FIG. 2, various types of sensors (a LiDAR sensor, an infrared sensor, an ultrasonic sensor, a depth sensor, an image sensor, a microphone, and the like) are disposed outside of the robot 1. The controller 250 collects and processes information sensed by the sensors.

The artificial intelligence unit 255 may input information that is processed by the LiDAR sensor 220, the camera sensor 230 and the other sensors, or information that is accumulated and stored while the robot 1 is moving, and the like, and may output results required for the controller 250 to determine an external situation, to process information and to generate a moving path.

As an example, the robot 1 may store information on positions of various objects, disposed in a space in which the robot is moving, as a map. The objects include a fixed object such as a wall, a door and the like, and a movable object such as a flower pot, a desk and the like. The artificial intelligence unit 255 may output data on a path taken by the robot, a range of work covered by the robot, and the like, using map information and information supplied by the LiDAR sensor 220, the camera sensor 230 and the other sensors.

Additionally, the artificial intelligence unit 255 may recognize objects disposed around the robot using information supplied by the LiDAR sensor 220, the camera sensor 230 and the other sensors. The artificial intelligence unit 255 may output meta information on an image by receiving the image. The meta information includes information on the name of an object in an image, a distance between an object and the robot, the sort of an object, whether an object is disposed on a map, and the like.

Information supplied by the LiDAR sensor 220, the camera sensor 230 and the other sensors is input to an input node of a deep learning network of the artificial intelligence unit 255, and then results are output from an output node of the artificial intelligence unit 255 through information processing of a hidden layer of the deep learning network of the artificial intelligence unit 255.

The controller 250 may calculate a moving path of the robot using date calculated by the artificial intelligence unit 255 or using data processed by various sensors.

Figure 3:
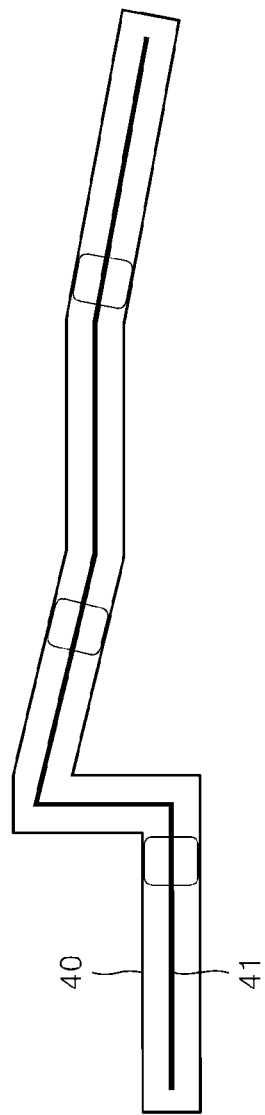
FIG. 3 shows a process in which a robot moves in a space.

The robot in FIG. 2 may perform any one or more of the above-described functions of generating a map and estimating a position while the robot is moving using the map. FIG. 3 shows an example of a space in which the robot in FIG. 2 generates a map, or estimates a position using a map.

FIG. 3 shows a process in which a robot moves in a space. The robot in the space 40 may move along a line indicated by reference No. 41, and may store information, sensed by the LiDAR sensor in a specific spot, in a map storage 210 using the LiDAR sensor 220. A basic shape of a space 40 may be stored as a local map.

Additionally, the robot may store information sensed by the camera sensor in a specific spot, in the map storage 210 using the camera sensor 230 while the robot is moving in the space 40.

Further, the robot may move in the space of FIG. 3, and the robot confirms current position by comparing stored information in the map storage 210.

Figure 4:
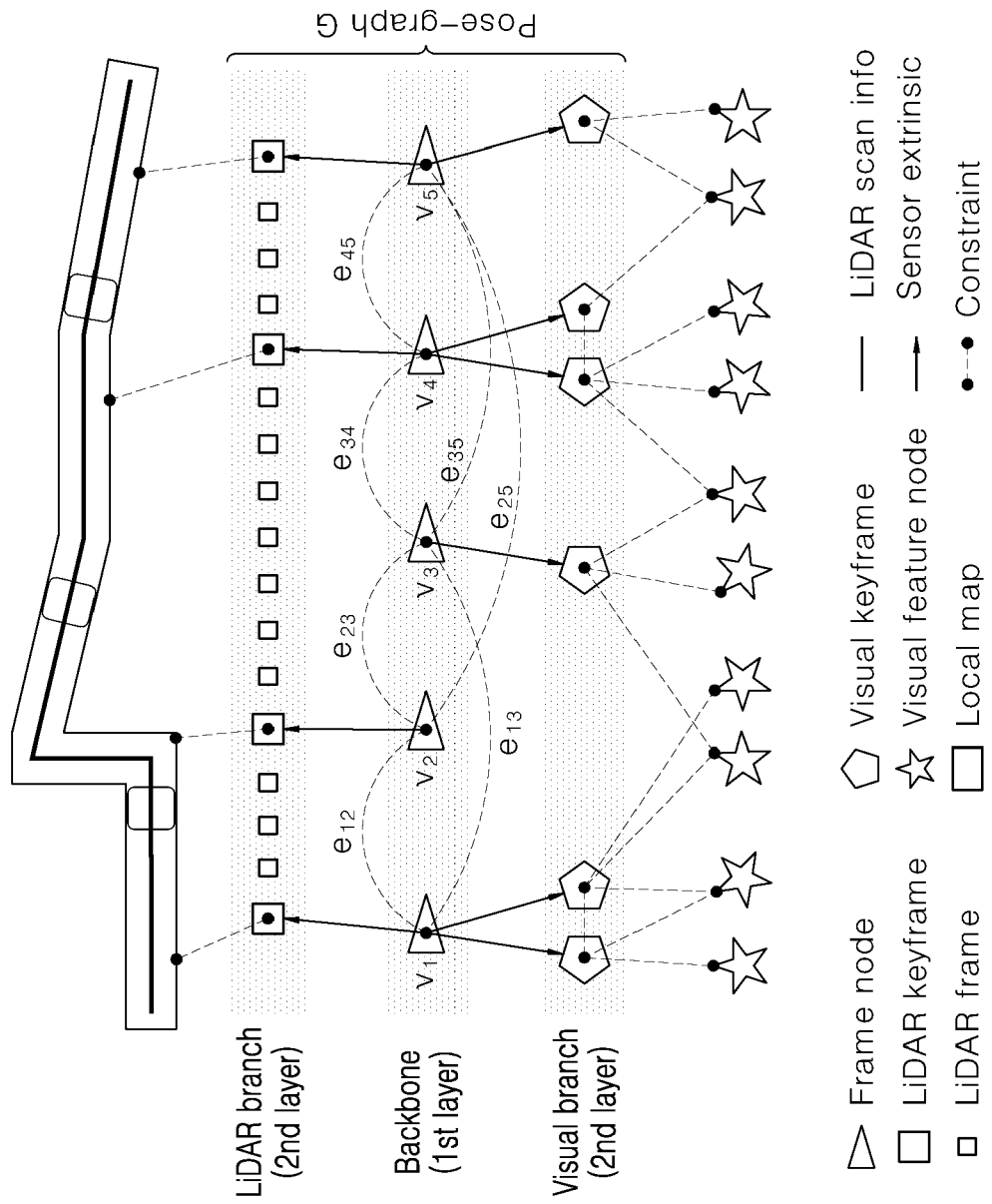
FIG. 4 shows a multiple structure of a map according to an embodiment.

FIG. 4 shows a multiple structure of a map according to an embodiment. FIG. 4 shows a double-layer structure in which a backbone is a first layer, and a LiDAR branch and a visual branch are respectively a second layer. The structure as in FIG. 4 is referred to as a structurally elastic pose graph-based SLAM.

The backbone is information on a trajectory of the robot. Additionally, the backbone includes one or more frame nodes corresponding to the trajectory. The frame nodes further include constraint information in a relation between the frame nodes and other frame nodes.

An edge between nodes denotes constraint information. The edge denotes odometry constraint information (odometry constraint) or loop constraint information (loop constraint).

The LiDAR branch of the second layer is comprised of LiDAR frames. The LiDAR frames include a LiDAR sensing value that is sensed while the robot is moving. At least one or more of the LiDAR frames are set as a LiDAR keyframe.

The LiDAR keyframe has a corresponding relation with the nodes of the backbone. In FIG. 4, nodes v1, v2, v4, and v5 of the backbone indicate a LiDAR keyframe among nodes v1 to v5 of the backbone.

The visual branch of the second layer is comprised of visual keyframes. The visual keyframes indicate one or more visual feature nodes that are camera sensing values (i.e., an image captured by the camera) sensed while the robot is moving. The robot may generate a plurality of visual feature nodes on the basis of the number of camera sensors disposed in the robot.

In the map structure of FIG. 4, the LiDAR keyframe or the visual keyframe is connected to the frame node of the backbone. Certainly, the LiDAR/visual keyframe may all be connected to a single frame node (v1, v4, and v5).

Poses of the robot at the LiDAR or the visual keyframe are same, and the LiDar or the visual keyframe is connected with each frame node. An extrinsic parameter may be added for each keyframe on the basis of a position of the robot, to which the LiDAR sensor or the camera sensor is attached. The extrinsic parameter denotes information on a relative position at which a sensor is attached from the center of the robot.

The visual keyframe has a corresponding relation with the node of the backbone. In FIG. 4, nodes v1, v3, v4, and v5 of the backbone indicate a visual keyframe among nodes v1 to v5 of the backbone. In FIG. 2, a pair of visual feature nodes (visual frames), comprised of two visual feature nodes, denote that the robot 1 captures an image using two camera sensors 230. There is an increase and a decrease in the number of visual feature nodes in each position on the basis of an increase and a decrease in the number of camera sensors 230.

Edges are displayed between nodes v1 to v5 constituting the backbone of the first layer. e12, e23, e34, and e45 are edges between adjacent nodes, and e13, e35, and e25 are edges between non-adjacent nodes.

Odometry constraint information, or for short, odometry information denotes constraints between adjacent frame nodes such as e12, e23, e34, and e45. Loop constraint information, or for short, loop information denotes constraints between non-adjacent frames such as e13, e25, and e35.

The backbone is comprised of a plurality of keyframes. The controller 250 may perform an initial mapping process to add the plurality of keyframes to the backbone. The initial mapping process includes adding the LiDAR keyframe and the visual frame based on the keyframe.

The structure of FIG. 4 is briefly described as follows. The LiDAR branch includes one or more LiDAR frames. The visual branch includes one or more visual frames.

Additionally, the backbone includes two or more frame nodes in which any one or more of a LiDAR frame or a visual frame are registered. In this case, the LiDAR frame or the visual frame registered in the frame node is referred to as a keyframe. A pose graph includes the LiDAR branch, the visual branch and the backbone.

Further, the pose graph includes odometry information, loop information and the like among frame nodes. The odometry information includes information on rotations, directions, and the like of wheels, which is generated while the robot is moving between frames nodes. The loop information is based on a set of frame nodes connected using specific constraints between visual keyframes around a specific frame node within a maximum sensing distance of the LiDAR sensor 220.

The controller 250 generates the pose graph in FIG. 4. The controller 250 stores the LiDAR branch, the visual branch, the backbone, the odometry information between frame nodes, and the pose graph including the premises in the map storage 210.

As described above, the pose graph as in FIG. 4 may be generated by the robot offering the function of generating a map and may be stored in a map storage 210 of all robots offering the function of driving.

The pose graph in FIG. 4 may be used for estimation of a position by the robot 1 even when any one of the camera sensor 230 and the LiDAR sensor 220 can operate. Alternately, the robot 1 may use another sensor and may enhance accuracy of estimating a position when any one sensor among sensors of the robot has low accuracy or when a plurality of positions are detected in response to information acquired by any one sensor.

For example, the robot 1 including one or more camera sensors 230 and one or more LiDAR sensors 220 may estimate a position using information acquired by multi sensors during fusion-SLAM. The robot 1 may estimate a position when any one of the results of estimation of positions that are estimated using each sensor is true.

Alternately, the robot 1 may estimate a position using information of each sensor, stored in the map storage 210, even when only some of the sensors of the robot 1 can operate or even when the robot 1 includes any one sensor. When a single LiDAR sensor 220 is used, the LiDAR sensor 220 covers 360 degrees.

Figure 5:
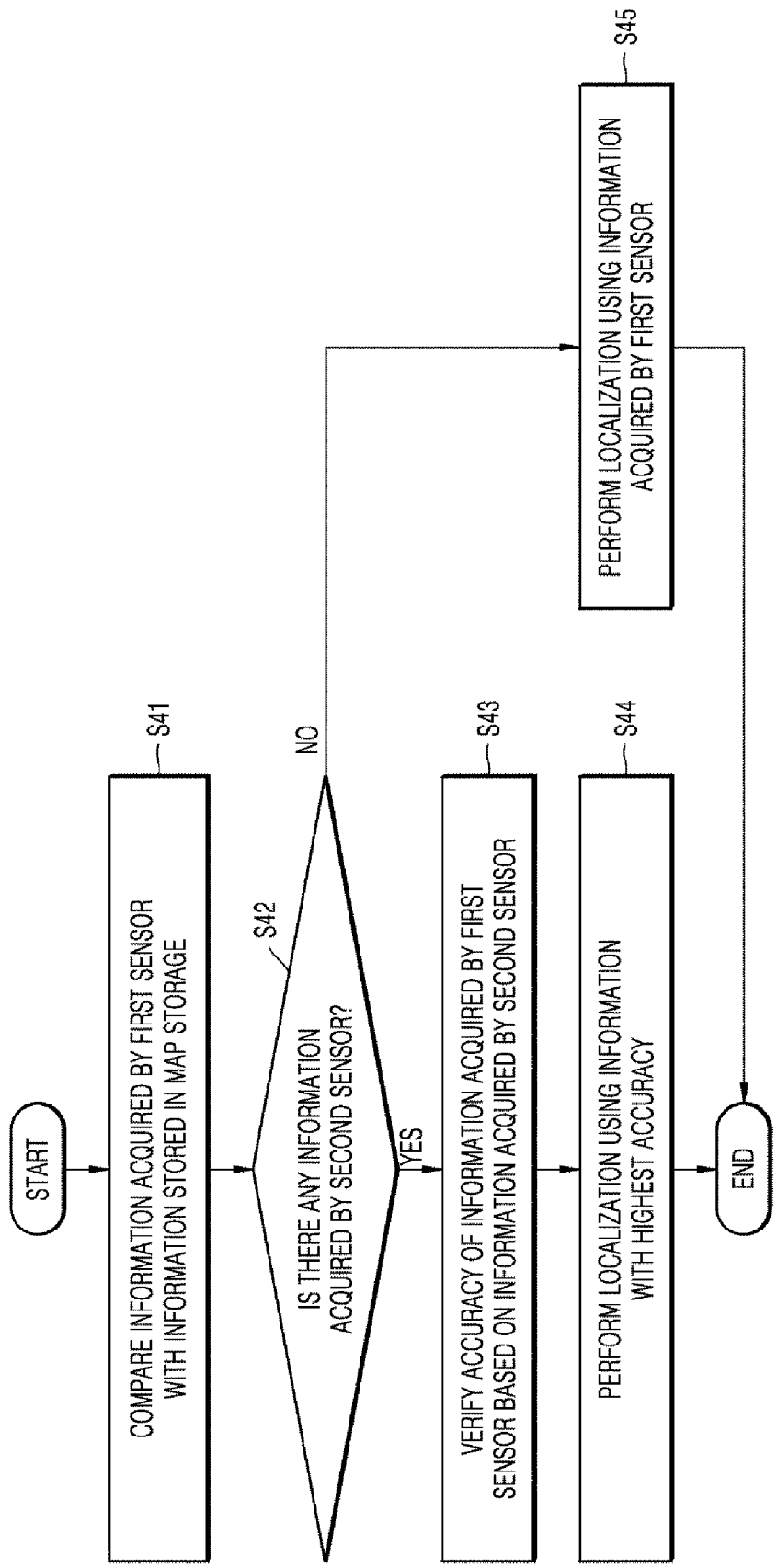
FIG. 5 shows a process of estimating a position using various sensors according to an embodiment.

FIG. 5 shows a process of estimating a position using various sensors according to an embodiment.

The robot 1 may be equipped with two types of sensors such as a first sensor and a second sensor to estimate a position. As illustrated in FIG. 2, as an example, the first sensor is a LiDAR sensor 220, and the second sensor is a camera sensor 230, or vice versa.

The controller 250 compares information acquired by the first sensor with information stored in the map storage (S41). As an example, the controller 250 may compare information registered in a frame node of a pose graph stored in the map storage 210, with the information acquired by the first sensor.

Additionally, the controller 250 confirms whether there is information acquired by the second sensor (S42). When there is the information acquired by the second sensor, the controller 250 verifies accuracy of the information acquired by the first sensor on the basis of the information acquired by the second sensor (S43).

Additionally, the controller 250 estimates a position using information with highest accuracy (S44).

When there is no information acquired by the second sensor in step 42, the controller 250 estimates a position using the information acquired by the first sensor (S45). In this case, the controller 250 may estimate a position by additionally using odometry information based on rotations or directions of the wheels, moving distances, and the like.

Figure 6:
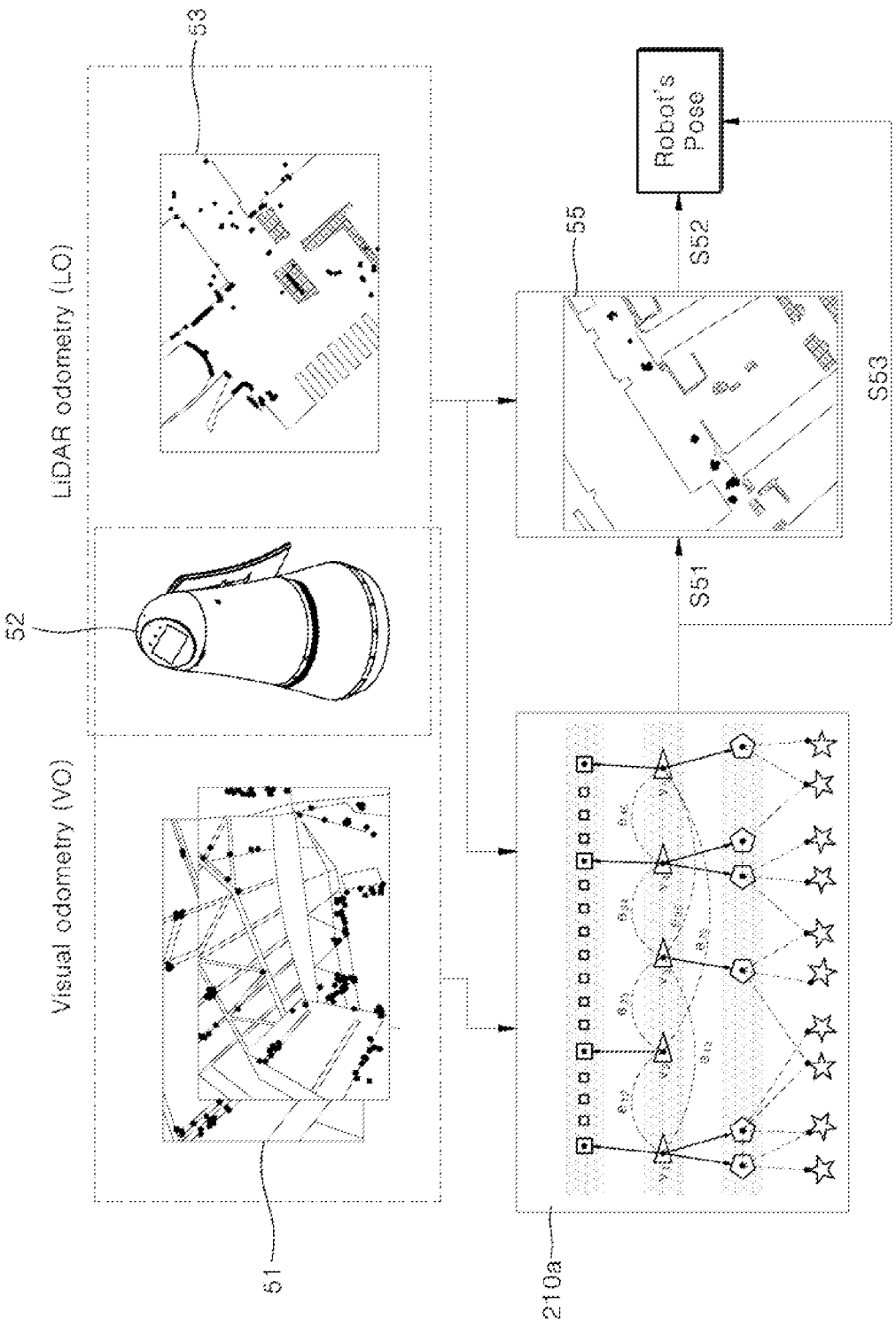
FIG. 6 shows a process of estimating a position of a robot using a LiDAR sensor and a camera sensor according to an embodiment.

FIG. 6 shows a process of estimating a position of a robot using a LiDAR sensor and a camera sensor according to an embodiment.

First, a case in which the camera sensor 230 is only available, or a case in which the LiDAR sensor 220 fails to acquire meaningful information is described. This is the case in which in FIG. 5, the first sensor is a camera sensor 230 and the second sensor is a LiDAR sensor 220, and in which a position is estimated through steps S41-S42-S45.

The controller 250 compares information (an image) 51 acquired by the camera sensor 230 and wheel odometry 52 calculated on the basis of the wheels of the moving unit of the robot 1 with visual frames registered in the pose graph of the map storage 210a. In this case, the controller 250 selects and compares only some of the entire visual frames that are currently stored by the robot 1 using the wheel odometry information. As a result, time and calculation resources spent on comparison of visual frames may be reduced.

The controller 250 may estimate a current position of the robot as a result of the comparison of visual frames in 51 and 210a. In this example, sensing values of the LiDAR sensor 220 are not used. The controller 250 may estimate a position of the robot by performing step 51 (extracting a visual frame) and step 53 (estimating a position) and by performing visual SLAM. Specifically, the controller 250 may enhance accuracy and reduce calculation time using wheel odometry.

Next, a case in which the LiDAR sensor 220 is only available, or a case in which the camera sensor 230 fails to acquire meaningful information is described. This is the case in which in FIG. 5, the first sensor is a LiDAR sensor 220 and the second sensor is a camera sensor 230, and in which a position is estimated through steps S41-S42-S45.

The controller 250 compares information (LiDAR scan data) 53 acquired by the LiDAR sensor 220 and wheel odometry 52 calculated on the basis of the wheels of the moving unit of the robot 1 with LiDAR frames registered in the pose graph of the map storage 210a. In this case, the controller 250 selects and compares only some of the entire LiDAR frames that are currently stored by the robot 1 using the wheel odometry information. As a result, time and calculation resources spent on comparison of LiDAR frames may be reduced.

The controller 250 may estimate a current position of the robot as a result of the comparison of LiDAR frames in 53 and 210a, as in 55. In this example, sensing values of the camera sensor 230 are not used. The controller 250 may estimate a position of the robot by performing step 51 (extracting a LiDAR frame) and step 52 (estimating a position by comparing a LiDAR frame) and by performing LiDAR SLAM. Specifically, the controller 250 may enhance accuracy and reduce calculation time using wheel odometry.

Next, a case in which two sensors are all available is described. Then a case in which the LiDAR sensor 220 and the camera sensor 230 can acquire meaningful information is described. This is the case in which in FIG. 5, the first sensor is a LiDAR sensor 220 and the second sensor is a camera sensor 230, or in which in FIG. 5, the second sensor is a LiDAR sensor 220 and the first sensor is a camera sensor 230, and in which a position is estimated through steps 41-42-43-44 in FIG. 5.

The controller 250 compares information (LiDAR scan data) 53 acquired by the LiDAR sensor 220 and wheel odometry 52 calculated on the basis of the wheels of the moving unit of the robot 1 with LiDAR frames registered in the pose graph of the map storage 210a. In this case, the controller 250 compares an image 51 acquired by the camera sensor 230 with visual frames registered in the pose graph.

In this process, the controller 250 selects and compares only some of the entire LiDAR frames that are currently stored by the robot 1 using the wheel odometry information. Likewise, the controller 250 selects and compares only some of the entire visual frames that are currently stored by the robot 1 using the wheel odometry information.

As a result, time and calculation resources required for comparison of LiDAR frames and for comparison of visual frames may be reduced.

The controller 250 may estimate a current position of the robot as a result of comparison of LiDAR frames in 53 and 210a, as in 55. In this example, sensing values of the camera sensor 230 are not used. The controller 250 may estimate a position of the robot by performing step 51 (extracting a LiDAR frame) and step 52 (estimating a position by comparing a LiDAR frame) and by performing LiDAR SLAM. Specifically, the controller 250 may enhance accuracy and reduce calculation time using wheel odometry.

The controller 250 extracts a candidate frame node from the map storage 210a using acquired information 51 of the camera sensor 230. Likewise, the controller 250 extracts a candidate frame node from the map storage 210a using acquired information 53 of the LiDAR sensor 220.

As a result, the controller 250 may estimate a position of the robot by comparing the frame nodes respectively extracted and by using any overlapped frame node.

Alternately, the controller 250 may put priority to information acquired by any one sensor, and, when there are a plurality of pieces of information, may enhance accuracy using information acquired by another sensor.

For example, suppose that the controller 250 searches the map storage 210a for a LiDAR frame comparable with a LiDAR frame that is acquired by the LiDAR sensor 220, and extracts a plurality of LiDAR frames from the map storage 210a. The controller 250 searches the map storage 210a for a visual frame comparable with a visual frame that is acquired by the camera sensor 230 and extracts one or more visual frames from the map storage 210a.

The controller 250 confirms a frame node in which the visual frame extracted from the map storage 210a is registered, or a LiDAR frame registered in a frame node adjacent to the frame node in which the visual frame extracted from the map storage 210a is registered, and selects a LiDAR frame with a high accuracy among the plurality of LiDAR frames extracted previously.

Figure 7:
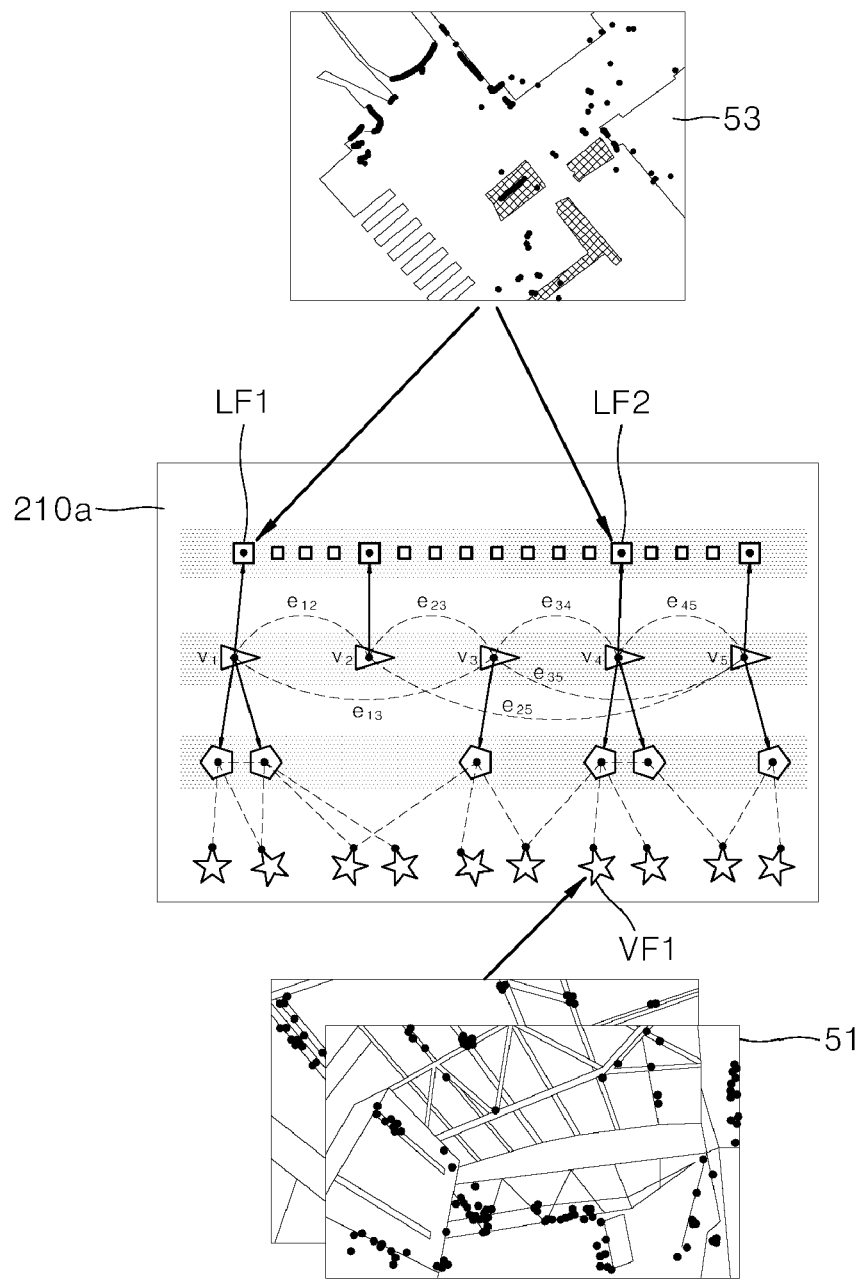
FIG. 7 shows a detailed process of estimating a position of a robot using a LiDAR sensor and a camera sensor according to an embodiment.

FIG. 7 shows a detailed process of estimating a position of a robot using a LiDAR sensor and a camera sensor according to an embodiment. FIG. 7 shows an example in which when there are a plurality of candidate positions for estimation of a position, a specific candidate position for estimation of a position is selected by using the camera sensor 230 on the basis of information acquired by the LiDAR sensor 220.

Using the LiDAR scan data 53 acquired by the LiDAR sensor 220, the controller 250 extracts LiDAR frame LF1 and LiDAR frame LF2 from the map storage 210a which are similar to the LiDAR scan data. LF1 is registered in frame node v1, and LF2 is registered in frame node v4. Additionally, positions of LF1 and LF2 are different.

For enhanced accuracy, the controller 250 uses the visual frame 51 acquired by the camera sensor 230. The controller 250 extracts a visual frame (VF1) similar to 51 from the map storage 210a.

As a result, the controller 250 confirms that VF1 is registered in frame node v4. LF2 is also registered in the frame node v4. Accordingly, the controller 250 determines that LF2 has higher accuracy than LF1, and estimates a position of the robot with respect to LF2.

Figure 8:
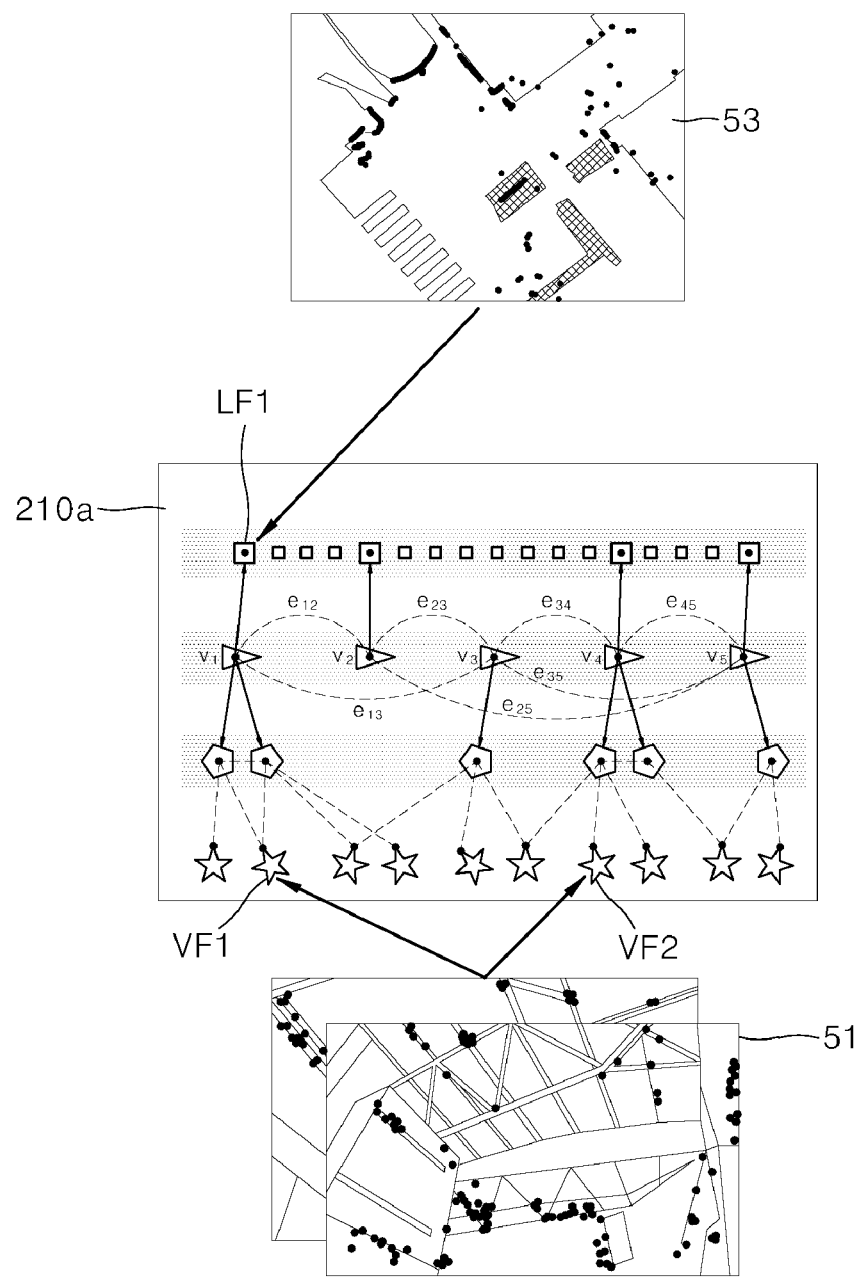
FIG. 8 shows a detailed process of estimating a position of a robot using a LiDAR sensor and a camera sensor according to an embodiment.

FIG. 8 shows a detailed process of estimating a position of a robot using a LiDAR sensor and a camera sensor according to an embodiment. FIG. 8 shows an example in which when there are a plurality of candidate positions for estimation of a position, a specific candidate position for estimation of a position is selected by using the LiDAR sensor 220 on the basis of information acquired by the camera sensor 230.

Using the camera image 51 acquired by the camera sensor 230, the controller 250 extracts visual frame VF1 and visual frame VF2 from the map storage 210a which are similar to the camera image. VF1 is registered in frame node v1, and VF2 is registered in frame node v4. Additionally, positions of VF1 and VF2 are different.

For enhanced accuracy, the controller 250 uses the LiDAR scan data 53 acquired by the LiDAR sensor 220. The controller 250 extracts a LiDAR frame (LF1) similar to 53 from the map storage 210a.

As a result, the controller 250 confirms that LF1 is registered in frame node v1. Additionally, the controller 250 confirms that VF1 is also registered in the frame node v1. Accordingly, the controller 250 determines that VF1 has higher accuracy than VF2, and estimates a position of the robot with respect to VF1.

In the examples of FIG. 6 to FIG. 8, when two types of sensors are all used, accuracy of estimation of a position may be enhanced. Specifically, the sensors may output results of estimation of positions respectively. Accordingly, the controller 250 may output results of estimation of positions with high accuracy by collecting the results of estimation of positions output by the two sensors.

In summary, the map storage 210 stores LiDAR scan data as a LiDAR frame and stores an image as a visual feature node. Additionally, the map storage 210 registers some or all of the LiDAR frames and visual feature nodes as a keyframe in a specific frame node of the pose graph.

Then the robot 1 compares the LiDAR frame/LiDAR keyframe or the visual feature node/visual frame, registered in the map storage 210, with information sensed by each sensor. When both of the sensors respectively correspond to or are similar to stored information of the same frame node, the robot 1 sets the position as a current position of the robot.

In this process, sensed information or information stored in the map storage 210, corresponding to a different position, are not subject to comparison during driving.

In the above-described embodiment, the controller 250 may confirm one or more candidate positions during comparison between the information acquired by each sensor and the information stored in the map storage. Herein, the sensor is not necessarily limited to a camera sensor and a LiDAR sensor.

The controller 250, for example, may acquire a candidate position from various types of sensors such as an inertial measurement unit (IMU) sensor, a GPS sensor, a sonar sensor, a radar sensor and the like in the same way that the controller 250 acquires a candidate position from the camera sensor and the LiDAR sensor. Additionally, through this process, the controller 250 may verify the validity of position information based on the information acquired by the LiDAR sensor 220.

The controller 250 may resample a LiDAR frame corresponding to a candidate position and may collect and determine a final position of the robot.

Thus, the controller 250 may select a candidate position (pose) capable of enhancing accuracy of estimation of a current position of the robot at a candidate position that is calculated as a result of estimation of a position by each sensor without combining sensors during fusion SLAM.

The above-described embodiment is briefly described as follows. The map storage 210 in FIG. 2 stores the above-described pose graph. The map storage 210 stores a LiDAR branch including a plurality of LiDAR frames comparable with a first LiDAR frame. Additionally, the map storage 210 stores a visual branch including a plurality of visual frames comparable with a first visual frame.

The map storage 210 stores a pose graph including a backbone including two or more frame nodes registered with any one or more of the stored LiDAR frames or the stored visual frames. Additionally, the map storage 210 stores odometry information between frame nodes.

The controller 250 compares a LiDAR frame registered in a frame node of the pose graph with a first LiDAR frame that is acquired by the LiDAR sensor 220 while the robot is moving. Additionally, the controller 250 compares a visual frame registered in a frame node of the pose graph with a first visual frame that is acquired by the camera sensor 230 while the robot is moving.

The controller 250 searches for a LiDAR frame stored in the map storage 210 to confirm a position corresponding to the first LiDAR frame. As a result of the search, the controller 250 may search for one or more candidate positions of the robot and may confirm the candidate positions in the pose graph.

Further, the controller 250 may confirm a position corresponding to the first visual frame to select any one of the candidate positions. In this process, the controller 250 searches for a visual frame stored in the map storage. As a result of the search, the controller 250 may search for one or more candidate positions of the robot and may confirm the candidate positions in the pose graph.

The controller 250 may determine accuracy of the candidate positions searched based on the LiDAR frame using the candidate positions searched based on the visual frame.

Figure 9:
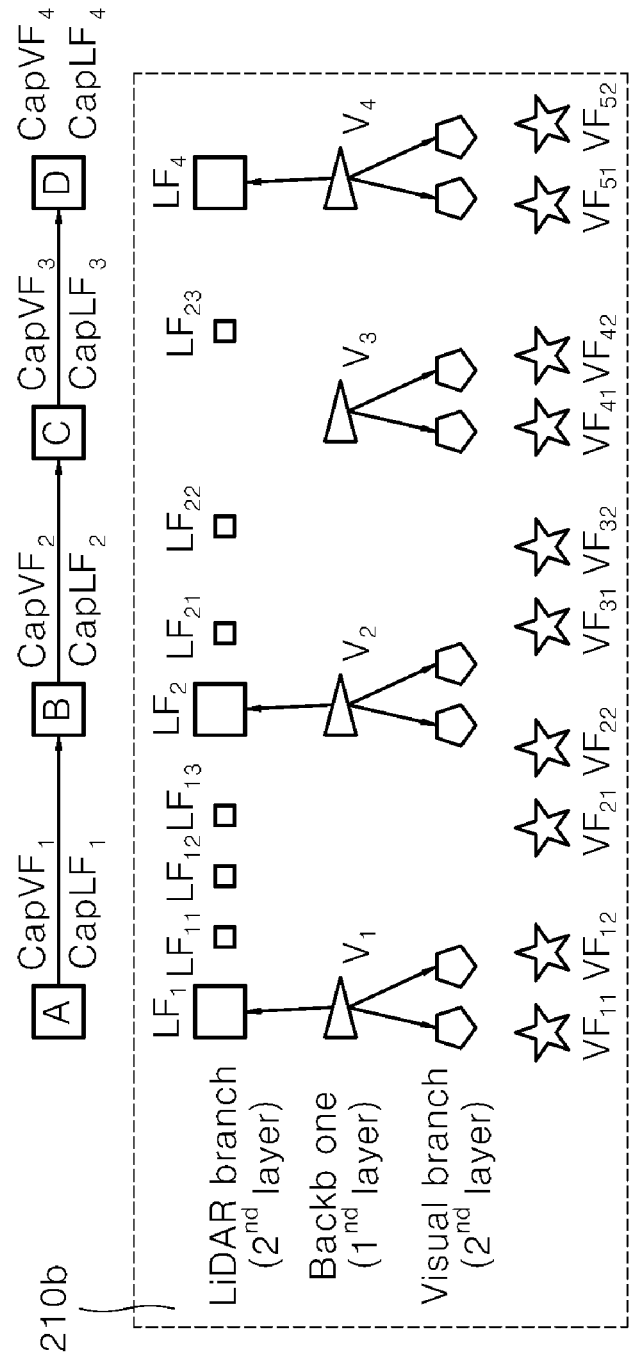
FIG. 9 shows a process of estimating a position according to an embodiment.

FIG. 9 shows a process of estimating a position according to an embodiment. The robot moves through positions A, B, C, and D. Pieces of information acquired by the camera sensor 230 of the robot 1 at each position are respectively $CapVF_1$ to $CapVF_4$. Scan data acquired by the LiDAR sensor 220 of the robot 1 at each position are respectively $CapLF_1$ to $CapLF_4$.

The map storage 210b is in the state of storing the pose graph and each of the LiDAR frames, each of the visual frames.

When the robot 1 moves from position A to position B, the controller 250 uses odometry information. That is, the controller 250 may confirm information on a direction or distance in which the robot moves from a frame node (v1) corresponding to position A, using odometry information.

When the robot 1 reaches position B, the controller 250 may determine that a current position of the robot is between v1 and v3 using odometry information. More accurately, when the robot 1 reaches position B, the controller 250 may determine that the current position of the robot is v2 or may determine that the current position of the robot is at least near v2, on the basis of the odometry information.

Accordingly, the controller 250 may compare the acquired LiDAR scan data, i.e., $CapLF_2$ that is a LiDAR frame acquired by the LiDAR sensor 220, with LiDAR frames ($LF_{12}$, $LF_{13}$, $LF_2$, and $LF_{21}$) around v2. Thus, the controller 250 may determine that any one LiDAR frame (e.g., $LF_2$) is similar to $CapLF_2$. In this case, the controller 250 may determine that the current position of the robot is v2.

Certainly, in this process, the controller 250 may compare visual frame $CapVF_2$, which is an image captured by the camera sensor 230, with $VF_{11}$ to $VF_{52}$ to determine that the current position of the robot is v2 more accurately. Alternately, the controller 250 may compare visual frame $CapVF_2$ with $VF_{21}$ to $VF_{32}$ because the controller 250 determines that the robot moves between v1 and v3.

As another example, the controller 250 may determine that two other LiDAR frames (e.g., $LF_{13}$ and $LF_{21}$) are similar to $CapLF_2$. In this case, the controller 250 is required to select the LiDAR frame with higher accuracy of the two LiDAR frames.

The controller 250 compares visual frame $CapVF_2$, which is an image acquired by the camera sensor 230, with visual frames stored in the map storage (210b). The controller 250 may compare visual frame $CapVF_2$ with an entire range of visual frames stored in the map storage (210b), but may reduce a range of visual frames comparable with visual frame $CapVF_2$ using odometry information to enhance efficiency of a search.

Alternately, the controller 250 may include visual frames corresponding to two LiDAR frames (e.g., $LF_{13}$ and $LF_{21}$) searched in the range for a search.

As a result of the search, the controller 250 may determine that a single visual frame (e.g., $VF_{31}$) is similar to $CapVF_2$.

In this case, the controller 250 confirms that a position of the robot is $LF_{21}$, using position information of the previously searched $LF_{13}$ and $LF_{21}$ and position information of $VF_{31}$.

In summary, the controller 250 extracts LiDAR frames $LF_{13}$ and $LF_{21}$ similar to LiDAR frame $CapLF_2$ acquired by the LiDAR sensor 220, from a frame node of the pose graph of the map storage 210b.

Additionally, the controller 250 extracts visual frame $VF_{31}$ similar to visual frame $CapVF_2$ that is an image acquired by the camera sensor 230, from a frame node of the pose graph of the map storage 210b.

Further, the controller 250 selects any one of $LF_{13}$ and $LF_{21}$ using $VF_{31}$, and calculates a current position of the robot using the selected LiDAR frame.

In this process, when $VF_{31}$ is registered in v2 node, the controller 250 may determine which of the LiDAR frames $LF_{13}$ and $LF_{21}$ is registered in v2 node.

When $VF_{31}$ is not registered in v2 node, the controller 250 may calculate a position with respect to a frame node the position of which has been confirmed most recently, using odometry information.

Figure 10:
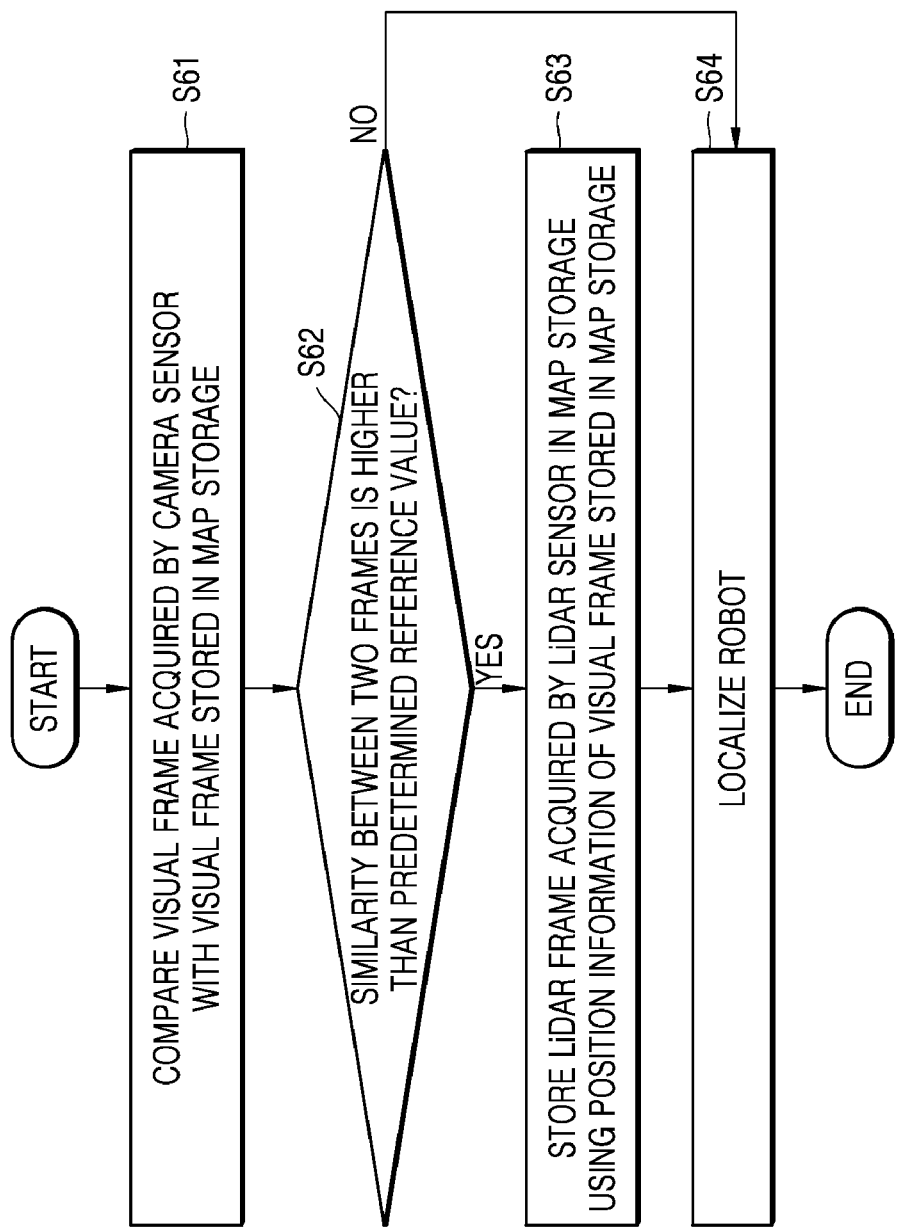
FIGS. 10 and 11 show a process of updating information of a map storage according to an embodiment.
Figure 11:
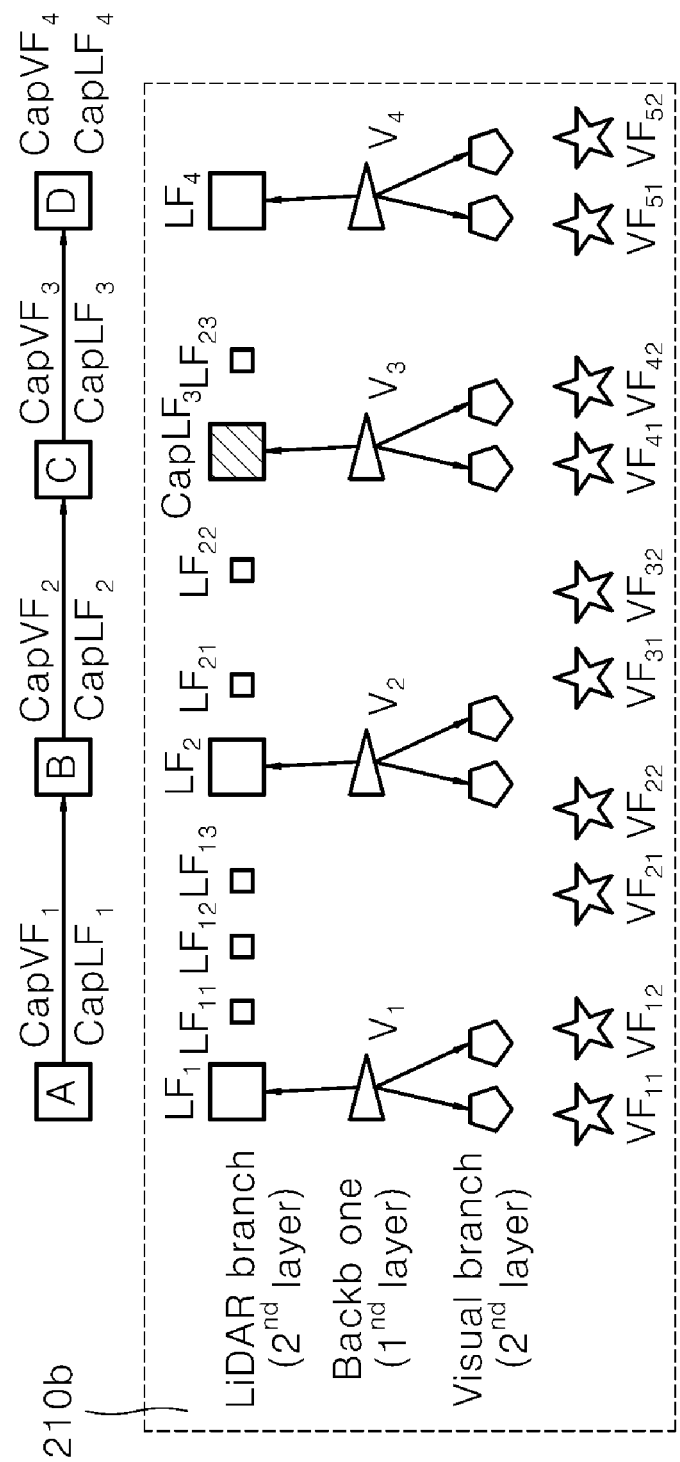

FIGS. 10 and 11 show a process of updating information of a map storage according to an embodiment.

The controller 250 of the robot 1 compares a visual frame acquired by the camera sensor 230 with a visual frame stored in the map storage 210 while the robot is moving (S61). When a similarity between the two visual frames is higher than a predetermined reference value as a result of the comparison (S62), a position of the robot 1 is very close to position information of the stored visual frame.

Accordingly, when a similarity between two frames is higher than a reference value in step 62, the controller 250 stores a LiDAR frame acquired by the LiDAR sensor in the map storage 210 using the position information of the visual frame stored in the map storage 210 (S63). Additionally, the controller 250 estimates a position of the robot 1 (S64).

If $CapVF_3$ is the same as $VF_{41}$ or very similar to $VF_{41}$ in FIG. 9, position C is very similar to a position of frame node v3. Frame node v3 is not currently registered in the LiDAR frame.

Accordingly, the controller 250 may register $CapLF_3$ in v3. FIG. 11 shows the results.

FIG. 11 shows a configuration in which a new LiDAR frame ($CapLF_3$) is added into the map storage 210*b* in FIG. 9. When a similarity between a visual frame ($CapVF_3$), acquired by the robot at position C, and $VF_{41}$ is higher than a certain criterion (e.g., 95% or more), the controller 250 may determine that the robot has reached position $VF_{41}$.

Further, a LiDAR frame is not registered in frame node v3 in which $VF_{41}$ is registered. Accordingly, to enhance map accuracy, the controller 250 may register LiDAR frame $CapLF_3$, scanned and generated by the LiDAR sensor 220 at position C, in v3.

According to the above-described embodiments, a position of the robot may be independently estimated using a camera sensor (a vision sensor) and a LiDAR sensor. The term "independently" indicates that a position of the robot may be estimated by using only one sensor.

Accordingly, the robot 1 may perform vision-only localization and LiDAR-only localization using each sensor. This indicates that each sensor has no influence on another sensor, and rather, indicates that accuracy of each sensor may be verified through other sensors. As a result, accuracy of localization may be enhanced.

Specifically, even when a specific sensor fails to estimate a position accurately due to environmental factors and the like, the robot 1 may perform fusion SLAM using other types of sensors.

For example, when a single camera sensor 230 is available, and when the lens of the camera is covered by another object (the state of occlusion), the field of view of the camera sensor 230 is limited, and the camera may fail to estimate a position. When two or more camera sensors 230 are available, localization may be performed using an image captured in different directions.

For example, in FIGS. 9 and 11, when $VF_{11}/VF_{12}$ are captured images by a pair of camera 230 at the same position, and any one of a pair of camera sensors 230 is blocked the other camera sensor may capture an image and may compare $VF_{11}/VF_{12}$.

Additionally, the camera sensor 230 may be vulnerable to changes in the environment, which are caused due to changes in light. Even in this case, the controller 250 may compare LiDAR scan data acquired by the LiDAR sensor 220 with a LiDAR frame stored in the map storage 210 and may perform localization.

Further, even when a reflective material is placed in an area sensed by the LiDAR sensor 220 or even when there is a change in a geometric structure, the controller 250 may compare image data acquired by the camera sensor 230 with a visual frame stored in the map storage 210 and may perform localization.

That is, even when any one sensor is unavailable, or even when any one sensor has low accuracy, values measured by another sensor may be used. Thus, accuracy and robustness of localization may be enhanced.

When two types of sensors are all available, the controller 250 may increase speeds of information searching in the map storage or may enhance accuracy of localization using information acquired by each sensor.

For example, when a LiDAR frame acquired by the robot in FIG. 11 is $CapLF_1$, the controller 250 calculates first position information (Pos1) and second position information (Pos2) using the LiDAR frame as candidate positions.

Likewise, a visual frame acquired by the robot is $CapVF_1$, the controller 250 calculates third position information (Pos3) and fourth position information (Pos4) using the visual frame as candidate positions.

Additionally, the controller 250 may calculate a position of the robot by comparing Pos1 with Pos3/Pos4 and comparing Pos2 with Pos3/Pos4. Alternately, the controller 250 may calculate a position of the robot by comparing Pos3 with Pos1/Pos2 and comparing Pos4 with Pos1/Pos2.

A comparison method may vary according to time spent on searching the map storage 210 for frames, accuracy of sensors and the like.

Figure 12:
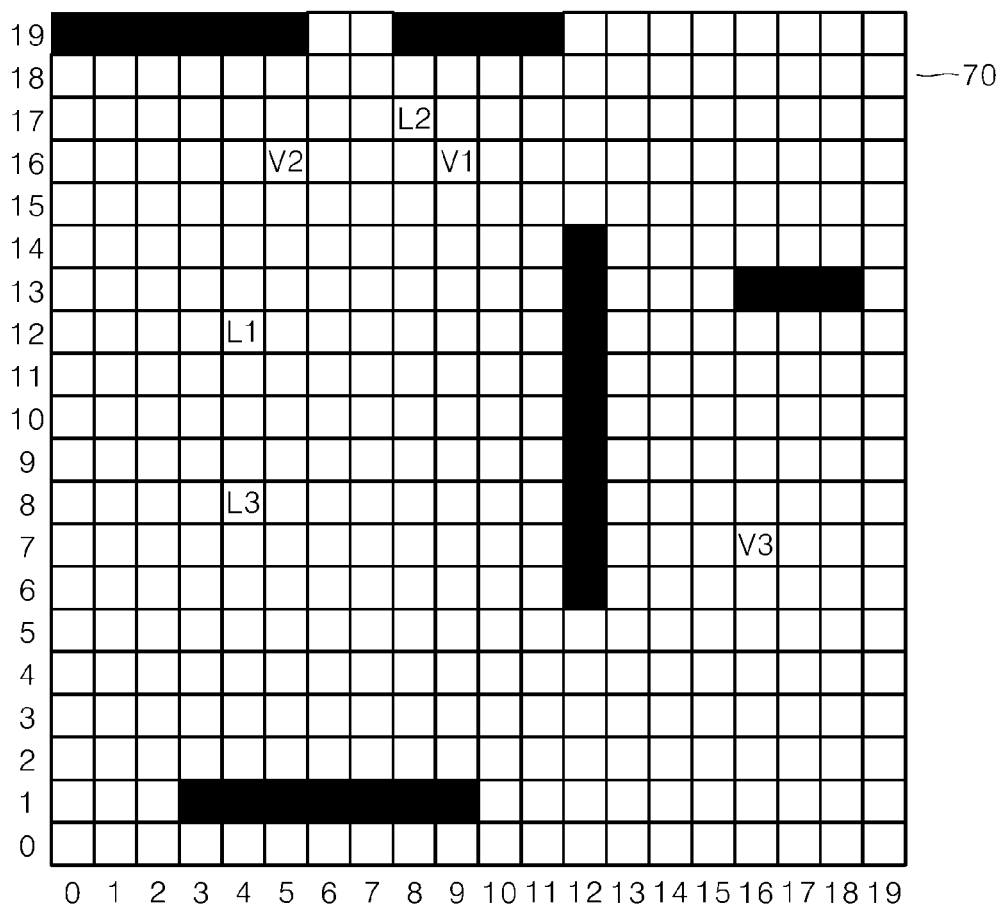
FIGS. 12 and 13 show processes of indicating a candidate position of a robot and of calculating a final position using two types of sensors according to an embodiment.
Figure 13:
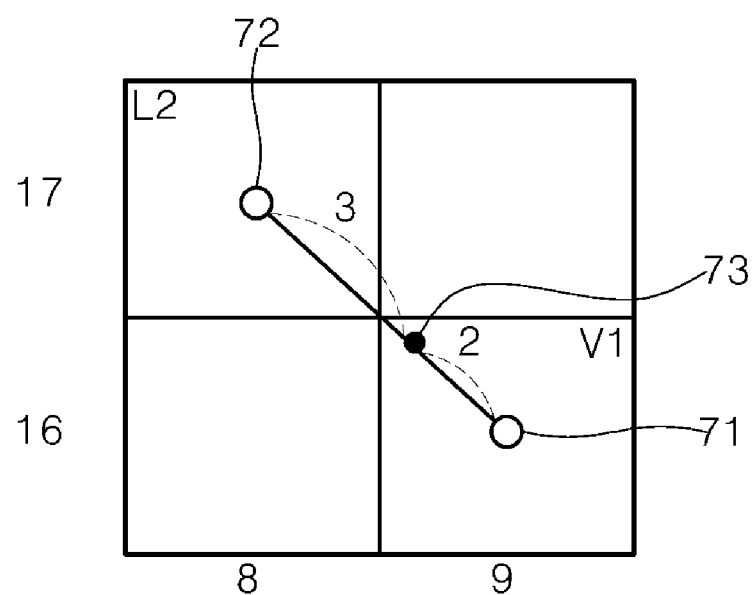

FIGS. 12 and 13 show processes of indicating a candidate position of a robot and of calculating a final position using two types of sensors according to an embodiment.

In FIG. 12, 70 displays a space in which the robot moves as a grid. As shown in 70, a 20×20 grid is stored in the map 210.

When a LiDAR frame, acquired by the robot at a specific position, is CapLF while the root 1 is moving, the controller 250 searches the map storage 210 for a LiDAR frame similar to CapLF. As a result of the search, LiDAR frames corresponding to specific positions on the grid are searched. Each position of the LiDAR frames is indicated as L1, L2, and L3.

When a visual frame that is surrounding image information acquired by the robot is CapVF, the controller 250 searches the map storage 210 for a visual frame similar to CapVF. As a result of the search, visual frames corresponding to specific positions on the grid are searched. Each position of the visual frames is indicated as V1, V2, and V3.

The controller 250 compares distances between the candidate positions

For example, the controller 250 calculates a distance between the two following points.

Distance between L1–V1: L1V1//Distance between L1–V2: L1V2//Distance between L1–V3: L1V3

Distance between L2–V1: L2V1//Distance between L2–V2: L2V2//Distance between L2–V3: L2V3

Distance between L3–V1: L3V1//Distance between L3–V2: L3V2//Distance between L3–V3: L3V3

Additionally, the controller 250 calculates points with the shortest distance among the calculated distances. In FIG. 12, L2V1 are closest points. The controller 250 may calculate a position of the robot with respect to L2 and V1. The controller 250 may determine the position of the robot as a middle point between two points. Alternately, the controller 250 may calculate position information of the robot based on a similarity between CapLF and L2. Alternately, the controller 250 may calculate a position of the robot based on a similarity between CapVF and V1.

That is, the controller 250 may calculate a position of the robot by comparing a similarity between CapLF and L2 and a similarity between CapVF and V1.

As an example, when the similarity between CapLF and L2 is 90% and the similarity between CapVF and V1 is 95%, the controller 250 may determine that the position of the robot is closer to V1 than L2. However, because the similarity between CapLF and L2 is 90%, the position of the robot may be set to a position close to V1 at the middle point between V1 and L2.

The position of the robot may be selected in a variety of ways depending on arithmetic proportion or accuracy of a sensor. When accuracy of the LiDAR sensor 220 is very high, the controller 250 sets a position of the robot to a position close to L2.

As an example, when a reference value of a similarity is 80%, the controller 250 may convert the similarity of 90% between CapLF and L2 into 10 (the result of calculation of 90−80). Likewise, the controller 250 may convert the similarity of 95% between CapVF and V1 into 15 (the result of calculation of 95−80).

Additionally, the difference is 10:15, accordingly, this ratio 10:15 may be converted into a ratio of 2:3. The controller 250 calculates a position of 2:3 between position information (9, 16) of V1 and position information (8, 17) of L2 and sets the position of the robot.

As illustrated in FIG. 13, the controller 250 calculates a point 73 that is 2:3 with respect to a central point 71 of V1 and with respect to a central point 72 of L2 as the position of the robot.

While the robot 1 performs SLAM, each sensor may acquire information at an area with high accuracy of localization or at an area with low accuracy of localization, and the robot 1 may store the information. Additionally, the robot 1 may learn the stored information using an artificial intelligence module and may repeatedly apply the information acquired at the area with low accuracy of localization or at the area with high accuracy of localization to the pose graph.

To this end, the artificial intelligence unit 255 of the controller 250 is a type of learning processor. The artificial intelligence unit 255 may process position information cumulatively stored by the robot 1 and information acquired by sensors, and numerical values on accuracy of localization and may update the pose graph.

Artificial intelligence refers to a field of researching artificial intelligence or researching methodologies for creating artificial intelligence, and machine learning refers to a field of defining various problems in the field of artificial intelligence and researching methodologies for solving the problems. The machine learning is defined as an algorithm that improves the performance of a task through consistent experiences with the task.

An artificial neural network (ANN) is a model used in machine learning and may refer to any kind of model having a problem-solving capability, the model being composed of artificial neurons (nodes) forming a network by a combination of synapses. The ANN may be defined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, and the like. Also, hyperparameters refer to parameters to be set before learning in a machine learning algorithm and includes a learning rate, the number of repetitions, a minimum placement size, an initialization function, and the like.

The training purpose of the ANN can be regarded as determining model parameters that minimize a loss function. The loss function may be used as an index for determining an optimal model parameter during the learning process of the ANN.

The machine learning may be classified as supervised learning, unsupervised learning, or reinforcement learning depending on the learning scheme.

The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent defined in any embodiment to select an action or a sequence of actions that maximizes cumulative reward in each state.

Machine learning implemented using a deep neural network (DNN) including a plurality of hidden layers in the ANN will be called deep learning, and the deep learning is a portion of the machine learning. In the following description, the machine learning is used as a meaning including the deep learning.

For the robot 1, the artificial intelligence unit 255 in FIG. 2 may perform an artificial intelligence function.

In this case, the communication unit 280 of the robot 1 may transmit or receive data to or from external apparatuses such as the AI server 300, which will be described in FIG. 9, or a robot for providing another artificial intelligence function through wired and wireless communication technologies. For example, the communication unit 280 may transmit or receive sensor information, user inputs, learning models, control signals, and the like to or from external apparatuses.

In this case, the communication technology used by the communication unit 280 includes Global System for Mobile Communication (GSM), code-division multiple access (CDMA), Long Term Evolution (LTE), 5G, Wireless LAN (WLAN), Wireless-Fidelity (Wi-Fi), Bluetooth™, Radio-Frequency Identification (RFID), Infrared Data Association (IrDA), ZigBee, Near Field Communication (NFC), and the like.

The interface unit 290 may acquire various kinds of data.

In this case, the interface unit 290 may include a camera for receiving an image signal input, a microphone for receiving an audio signal, a user input unit for receiving information from a user, and the like. Here, information acquired by the LiDAR sensor 220, the camera sensor 230, or the microphone refers to sensing data, sensor information, and the like.

The interface unit 290, various kinds of sensors, the wheel encoder 260, and the like may acquire input data or the like to be used when an output is acquired using a learning model and learning data for learning a model. The aforementioned elements may acquire raw input data. In this case, the controller 250 or the artificial intelligence unit 255 may extract an input feature as a preprocessing process for the input data.

The artificial intelligence unit 255 may train a model composed of an ANN using learning data. Here, the trained ANN may be called a learning model. The learning model may be used to infer a result value not for the learning data but for new input data, and the inferred value may be used as a determination basis for the robot 1 to perform a certain operation.

In this case, the artificial intelligence unit 255 may perform artificial intelligence processing along with the artificial intelligence unit 355 of the AI server 300.

In this case, the artificial intelligence unit 255 may include a memory integrated or implemented in the robot 1. Alternatively, the artificial intelligence unit 255 may be implemented using a separate memory, an external memory coupled to the robot 1, or a memory held in an external apparatus.

The robot 1 may acquire at least one of internal information of the robot 1, environmental information of the robot 1, and user information using various sensors.

Sensors included in the robot 1 include a proximity sensor, an illumination sensor, an acceleration sensor, a magnetic sensor, a gyroscope sensor, an inertial sensor, an RGB sensor, an infrared sensor (IR sensor), a finger scan sensor, an ultrasonic sensor, an optical sensor, a microphone, a LiDAR sensor 220, a camera sensor 230, a radar sensor and the like.

The above-described interface unit 290 may generate output in relation to vision, hearing or touch and the like.

In this case, the interface unit 290 may include a display unit outputting visual information, a speaker outputting auditory information, a haptic module outputting tactile information and the like.

A memory built in the robot 1 may store data supporting various functions of the robot 1. For example, the memory may store input data, learning data, a learning model, a learning history, and the like which are acquired by the interface unit 290 or various kinds of sensors built in the robot 1.

The controller 250 may determine at least one executable operation of the robot 1 on the basis of information determined or generated using a data analysis algorithm or a machine learning algorithm. Also, the controller 250 may control the elements of the robot 1 to perform the determined operation.

To this end, the controller 250 may request, retrieve, receive, or utilize data of the artificial intelligence unit 255 or the memory and may control the elements of the robot 1 to execute a predicted operation or an operation determined as being desirable among the at least one executable operation.

In this case, when there is a need for connection to an external apparatus in order to perform the determined operation, the controller 250 may generate a control signal for controlling the external apparatus and transmit the generated control signal to the external apparatus.

The controller 250 may acquire intention information with respect to a user input and may determine a user's requirements based on the acquired intention information.

In this case, the controller 250 may acquire intention information corresponding to user input using at least one or more of a speech-to-text (STT) engine for transforming voice input into character strings or a natural language processing (NLP) engine for acquiring intention information of natural language.

In this case, at least part of at least one or more of the STT engine or the NLP engine may include an artificial intelligence network trained based on a machine learning algorithm. Additionally, at least one or more of the STT engine or the NLP engine may be trained by the artificial intelligence unit 255, or by the learning processor 340 of the AI server 300, or by distributed processing thereof.

The controller 250 may collect history information including details of operation of the robot 1, a user's feedback on operation of the robot and the like and may store the history information in the memory or the artificial intelligence unit 255, or may transmit the history information to an external device such as the AI server 300 and the like. The collected history information may be used to update a learning model.

The controller 250 may control at least part of components of the robot 1 to drive an application program stored in the memory 170. Further, the controller 250 may combine and operate two or more of the components included in the robot 1 to drive the application program.

Alternately, an additional artificial intelligence (AI) server communicating with the robot 1 may be provided and may process information supplied by the robot 1.

Figure 14:
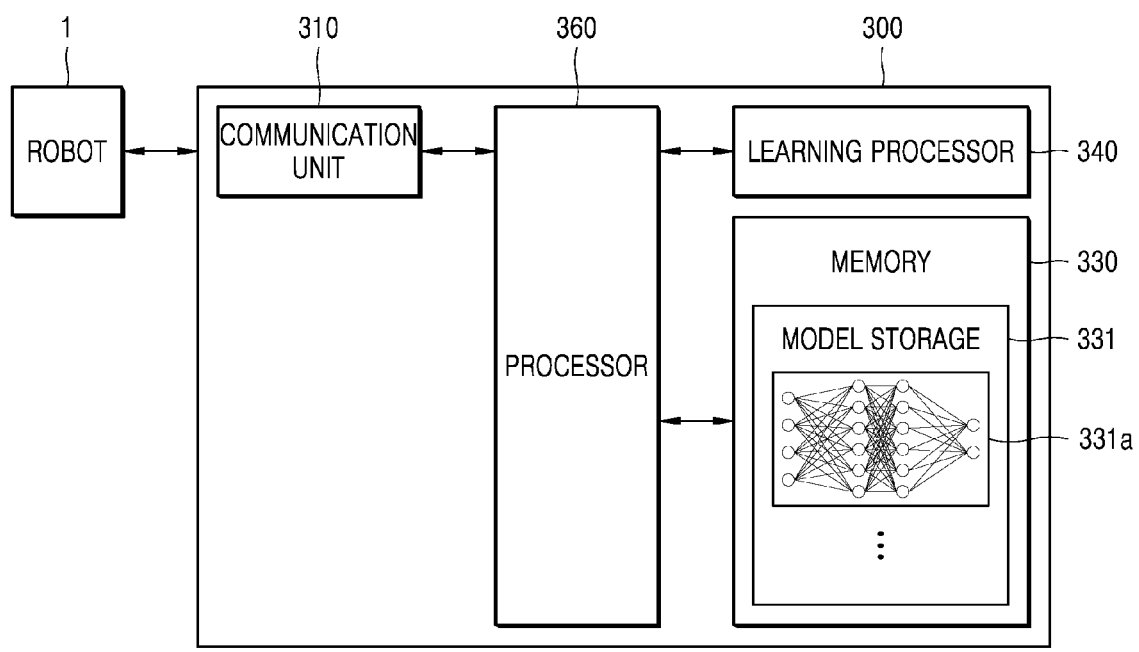
FIG. 14 shows a configuration of an AI server according to an embodiment.

FIG. 14 shows a configuration of an AI server 300 according to an embodiment.

An artificial intelligence server, i.e., an AI server 300, may denote a device that trains an artificial neural network using a machine learning algorithm or that uses a trained artificial neural network. The AI server 300, which includes a plurality of servers, may perform distributed processing and may be defined as a 5G network. In this case, the AI server 300 may be included as a partial configuration of an AI device 100 and may perform at least part of AI processing together with the AI device 100.

The AI server 300 may include a communication unit 310, a memory 330, a learning processor 340 and a processor 360 and the like.

The communication unit 310 may transmit or receive data to or from an external device such as the robot 1 and the like.

The memory 330 may include a model storage unit 331. The model storage unit 331 may store a model 231a (or an artificial neural network) that is being trained or is trained through a learning processor 340.

The learning processor 340 may train the artificial neural network 331a using learning data. A learning model may be used in the state of being mounted onto the AI server 300 of the artificial neural network, or may be used in the state of being mounted onto an external device such as the robot 1 and the like.

The learning model may be implemented as hardware, software or a combination thereof. When all or part of the learning model is implemented as software, one or more instructions constituting the learning model may be stored in the memory 330.

The processor 360 may infer result values on new input data using the learning model, and may generate responses or control instructions based on the inferred result values.

Figure 15:
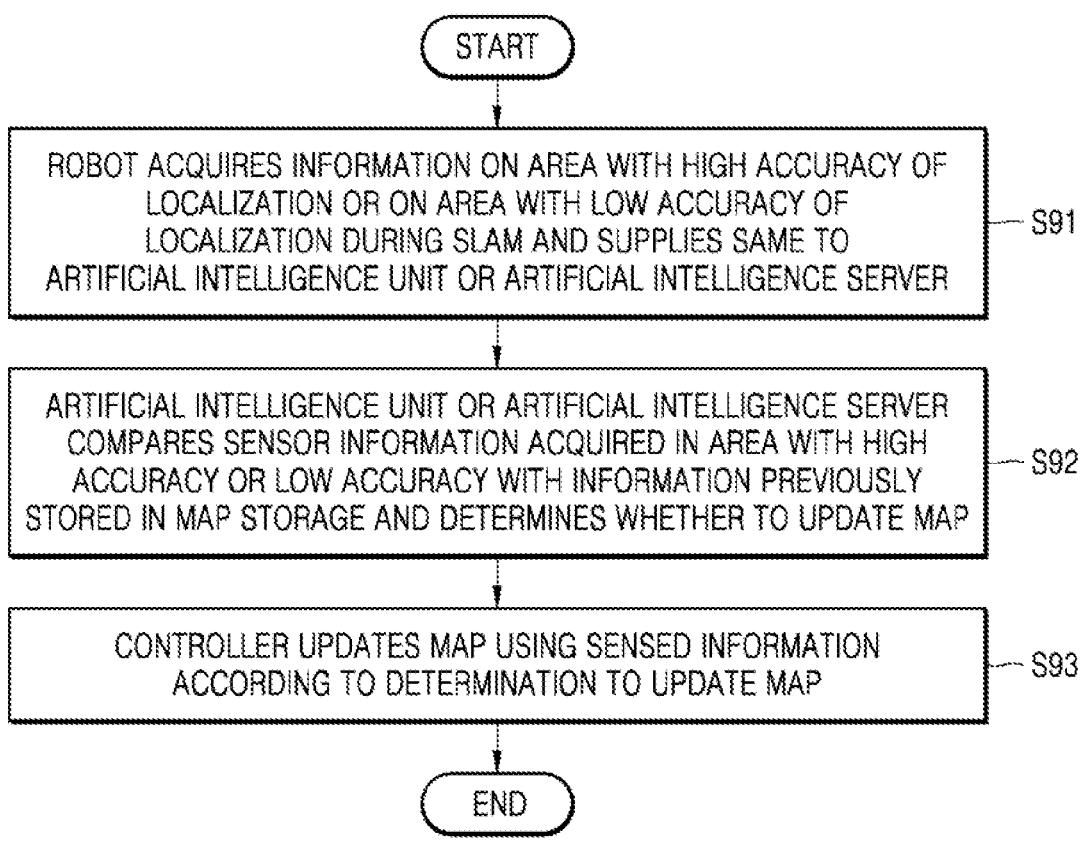
FIG. 15 shows a process of updating a pose graph on the basis of artificial intelligence during SLAM of a robot according to an embodiment.

FIG. 15 shows a process of updating a pose graph on the basis of artificial intelligence during SLAM of a robot according to an embodiment.

While performing SLAM, the robot acquires information on an area with high accuracy of localization or an area with low accuracy of localization. That is, the robot supplies information sensed by the LiDAR sensor 220 or the camera sensor 230, accuracy of localization preformed by the robot on the basis of the information, and position information to the artificial intelligence unit 255 or the AI server 300 (S91).

The artificial intelligence unit 255 or the artificial intelligence server 300 compares accuracy of pieces of information acquired by each sensor according to position information, using the supplied information. The artificial intelligence unit 255 or the artificial intelligence server 300 compares sensor information acquired at an area with high accuracy or with low accuracy with information previously stored in the map storage, and determines whether to update a map (S92).

Then the controller 250 updates the map using sensed information according to the determination to update the map (S93). As an example, the controller 250 may update a LiDAR frame/visual frame registered in the pose graph.

According to the process of FIG. 15, while the robot 1 performs SLAM, each sensor may acquire information at an area with high accuracy of localization or at an area with low accuracy of localization, and the robot 1 may store the information. Additionally, the robot 1 may learn the stored information using an artificial intelligence module and may repeatedly apply the information acquired at the area with low accuracy of localization or at the area with high accuracy of localization to the pose graph.

AI technologies may be applied to the robot 1, and the robot 1 may be implemented as a guide robot, a transportation robot, a cleaning robot, a wearable robot, an entertainment robot, a pet robot, an unmanned aerial robot, and the like.

The robot 1 may include a robot control module for controlling operations, and the robot control module may denote a software module or a chip in which a software module is implemented as hard ware.

The robot 1 may acquire its state information, may detect (recognize) a surrounding environment and a surrounding object, may generate map data, may determine a moving path and a driving plan, may determine a response to user interaction or may determine an operation, using sensor information obtained from various types of sensors.

The robot 1 may use sensor information obtained by at least one or more sensors among a LiDAR sensor, a radar sensor, and a camera sensor to determine a moving path and a driving plan.

The robot 1 may perform the above-described operations using a learning model comprised of at least one or more artificial neural networks. For example, the robot 1 may recognize a surrounding environment and a surrounding object using the learning model, and may determine an operation using information on the recognized surrounding environment or object. The learning model may be directly learned by the robot 1 or by an external device such as an AI server 300 and the like.

In this case, the robot 1 may perform operations by directly using the learning model and generating results. The robot 1 may also perform operations by transmitting sensor information to an external device such as an AI server 300 and the like and by receiving results that are generated as a result.

The robot 1 may determine a moving path and a driving plan using at least one or more of map data, object information detected from sensor information, or object information obtained from an external device, and may drive on the basis of the determined moving path and driving plan by controlling a driving unit.

Map data may include object identification information on various objects in a space in which the robot 1 moves. For example, the map data may include object identification information on fixed objects such as a wall, a door and the like, and on movable objects such as a flower pot, a desk and the like. Additionally, the object identification information may include a name, a sort, a distance, a location and the like.

Further, the robot 1 may perform operations or may perform driving by controlling the driving unit on the basis of control/interactions of a user. In this case, the robot 1 may obtain intention information on interactions according to operations of the user or utterance of voices of the user, may determine responses on the basis of the obtained intention information, and may perform operations.

The controller 250 according to embodiments of the present disclosure may be equipped with an artificial intelligence module. In this case, the controller 250 may be equipped with an artificial intelligence module to search for a LiDAR frame similar to information acquired at a current position, among LiDAR frames stored in the map storage 210. For example, a deep learning network may be used to search an image, and the controller 250 including the deep learning network may increase the speed of a search for an image.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

The invention claimed is:

1. A robot performing localization using multi sensors, comprising:
 a motor configured to move the robot within a space divided into a grid;
 a light detection and ranging (LiDAR) sensor configured to sense a distance between an external object and to generate a first LiDAR frame;

a camera sensor configured to capture an image of the external object and to generate a first visual frame;

a map storage configured to store: a LiDAR branch including a plurality of LiDAR frames comparable with the generated first LiDAR frame, a visual branch including a plurality of visual frames comparable with the generated first visual frame, a graph including a backbone including two or more frame nodes registered with any one or more of stored LiDAR frames or stored visual frames, and odometry information generated while the robot moves between a first location correlated with a first frame from among the two or more frame nodes and a second location correlated with a second frame from among the two or more frame nodes; and a controller configured to:

perform a first comparison of a LiDAR frame associated with a frame node of the graph with the generated first LiDAR frame by searching, using the generated first LIDAR frame, the map storage for a L1 LIDAR frame at a first position on the grid and a L2 LIDAR frame at a second position on the grid, perform a second comparison of a visual frame associated with the frame node of the graph with the generated first visual frame by searching, using the generated first visual frame, the map storage for a V1 visual frame at a third position on the grid and a V2 visual frame at a fourth position on the grid, and determine a current position of the robot based at least in part on determining an accuracy of the first comparison and the second comparison, wherein based on a distance between the L1 LIDAR frame and the V1 visual frame being a shortest distance among distances between: the L1 LIDAR frame and the V1 visual frame, the L1 LIDAR frame and the V2 visual frame, and the L2 LIDAR frame and the V1 visual frame, and the L2 LIDAR frame and the V2 visual frame, the current position of the robot is determined as between the L1 LIDAR frame and the V1 visual frame, and based on a similarity between the L1 LIDAR frame and the V1 visual frame.

2. The robot of claim 1, wherein the current position of the robot is determined using the generated odometry information.

3. The robot of claim 1, wherein the controller is further configured to:

extract a second LiDAR frame and a third LiDAR frame similar to the generated first LiDAR frame from the frame node of the graph, extract a second visual frame similar to the generated first visual frame from the frame node of the graph, and select any one of the extracted second LiDAR frame or the extracted third LiDAR frame using the extracted second visual frame, wherein the current position of the robot is determined using the selected LiDAR frame.

4. The robot of claim 3, wherein the controller is further configured to store the generated first LiDAR frame in the map storage according to position information of the extracted second visual frame based at least in part on a similarity between the generated first visual frame and the extracted second visual frame being higher than a predetermined reference value.

5. The robot of claim 1, wherein the controller is further configured to:

search for first position information and second position information using the generated first LiDAR frame by processing LiDAR SLAM, and search for third position information and fourth position information using the generated first visual frame by processing Visual SLAM, wherein the current position of the robot is determined using the first position information, the second position information, the third position information and the fourth position information.

6. The robot of claim 5, wherein the controller is further configured to:

compare a first distance between the first position information and the third position information, a second distance between the second position information and the third position information, a third distance between the first position information and the fourth position information, and a fourth distance between the second position information and the fourth position information, and wherein the current position of the robot is determined by using a shortest distance from among the first distance, the second distance, the third distance, and the fourth distance.

7. The robot of claim 6, wherein the current position of the robot is determined by comparing a similarity between the generated first LiDAR frame and a particular LiDAR frame of the first position information with a similarity between an extracted second visual frame and a particular visual frame of the third position information based at least in part on a determination that the first distance is the shortest distance from among the first distance, the second distance, the third distance, and the fourth distance.

8. A method of localization using multi sensors, comprising:

sensing, by a LiDAR sensor of a robot, a distance between an external object;

generating, by the LiDAR sensor, a first LiDAR frame while a motor moves the robot within a space divided into a grid;

capturing, by a camera sensor of the robot, an image of the external object;

generating, by the camera sensor, a first visual frame;

performing a first comparison of a LiDAR frame associated with a frame node of a graph with the generated first LiDAR frame by searching, using the generated first LIDAR frame, a map storage for a L1 LIDAR frame at a first position on the grid and a L2 LIDAR frame at a second position on the grid;

performing a second comparison of a visual frame associated with a frame node of the graph with the generated first visual frame by searching, using the generated first visual frame, the map storage for a V1 visual frame at a third position on the grid and a V2 visual frame at a fourth position on the grid; and determine a current position of the robot based at least in part on determining an accuracy of the first comparison and the second comparison, wherein based on a distance between the L1 LIDAR frame and the V1 visual frame being a shortest distance among distances between: the L1 LIDAR frame and the V1 visual frame, the L1 LIDAR frame and the V2 visual frame, and the L2 LIDAR frame and the V1 visual frame, and the L2 LIDAR frame and the V2 visual frame, the current position of the robot is determined as between the L1 LIDAR frame and the V1 visual frame, and based on a similarity between the L1 LIDAR frame and the V1 visual frame.

9. The method of claim 8, further comprising a map storage configured to store: a LiDAR branch including a plurality of LiDAR frames comparable with the generated first LiDAR frame, a visual branch including a plurality of visual frames comparable with the generated first visual frame, the graph including a backbone including two or more frame nodes associated with any one or more of stored LiDAR frames or stored visual frames, and odometry information generated while the robot moves between a first location correlated with a first frame from among the two or more frame nodes and a second location correlated with a second frame from among the two or more frame nodes.

10. The method of claim 8, where the current position of the robot is determined using odometry information generated while the robot moves between a first location correlated with a first frame from among two or more frame nodes and a second location correlated with a second frame from among the two or more frame nodes.

11. The method of claim 9, further comprising:
extracting a second LiDAR frame and a third LiDAR frame similar to the generated first LiDAR frame from the frame node of the graph;
extracting a second visual frame similar to the generated first visual frame from the frame node of the graph; and
selecting any one of the extracted second LiDAR frame or the extracted third LiDAR frame using the extracted second visual frame, wherein the current position of the robot is determined using the selected LiDAR frame.

12. The method of claim 11, wherein the method further comprises storing the generated first LiDAR frame in the map storage according to position information of the extracted second visual frame based at least in part on a similarity between the generated first visual frame and the extracted second visual frame being higher than a predetermined reference value.

13. The method of claim 8, further comprising:
searching for first position information and second position information using the generated first LiDAR frame by processing LiDAR SLAM; and
searching for third position information and fourth position information using the generated first visual frame by processing Visual SLAM, wherein the current position of the robot is determined using the first position information, the second position information, the third position information and the fourth position information.

14. The method of claim 13, wherein the method further comprises comparing a first distance between the first position information and the third position information, a second distance between the second position information and the third position information, a third distance between the first position information and the fourth position information, and a fourth distance between the second position information and the fourth position information, and wherein the current position of the robot is determined by using a shortest distance from among the first distance, the second distance, the third distance, and the fourth distance.

15. The method of claim 14, wherein the current position of the robot is determined by comparing a similarity between the generated first LiDAR frame and a particular LiDAR frame of the first position information with a similarity between extracted second visual frame and a particular visual frame of the third position information based at least in part on a determination that the first distance is the shortest distance from among the first distance, the second distance, the third distance, and the fourth distance.

16. A robot performing localization using multi sensors, comprising:
a motor configured to move a robot within a space divided into a grid;
a LiDAR sensor configured to sense a distance between an external object and generate a first LiDAR frame;
a camera sensor configured to capturing an image of an external object and generate a first visual frame;
a map storage configured to store a LiDAR branch including a plurality of LiDAR frames comparable with the generated first LiDAR frame, a visual branch including a plurality of visual frames comparable with the generated first visual frame, a graph including a backbone including two or more frame nodes registered with any one or more of stored LiDAR frames or stored visual frames, odometry information generated while the robot moves between a first location correlated with a first frame from among the two or more frame nodes and a second location correlated with a second frame from among the two or more frame nodes; and store a space in which the robot moves as a grid; and
a controller configured to:
perform a first comparison of a LiDAR frame associated with a frame node of the graph with the generated first LiDAR frame by searching, using the generated first LIDAR frame, the map storage for a L1 LIDAR frame at a first position on the grid and a L2 LIDAR frame at a second position on the grid,
perform a second comparison of a visual frame associated with the frame node of the graph with the generated first visual frame by searching, using the generated first visual frame, the map storage for a V1 visual frame at a third position on the grid and a V2 visual frame at a fourth position on the grid, and
determine a current position of the robot based at least in part on determining an accuracy of the first comparison and the second comparison, wherein based on a distance between the L1 LIDAR frame and the V1 visual frame being a shortest distance among distances between: the L1 LIDAR frame and the V1 visual frame, the L1 LIDAR frame and the V2 visual frame, and the L2 LIDAR frame and the V1 visual frame, and the L2 LIDAR frame and the V2 visual frame, the current position of the robot is determined as between the L1 LIDAR frame and the V1 visual frame, and based on a similarity between the L1 LIDAR frame and the V1 visual frame.

17. The robot of claim 16, wherein the controller searches the map storage for a LiDAR frame acquired by the robot, and results of the search include LiDAR frames corresponding to a specific position on the grid,
the controller searches the map storage for a visual frame acquired by the robot, and results of the search include visual frames corresponding to a specific position on the grid, and
the controller calculates distances between the LiDAR frames included in the results of the search and the visual frames included in the results of the search.

18. The robot of claim 17, wherein the controller calculates a position of the robot with respect to a point of a shortest distance among the calculated distances.

19. The robot of claim 18, wherein the controller compares a similarity between a searched LiDAR frame corresponding to any one of two points of the shortest distance and the acquired LiDAR frame with a similarity between a searched visual frame corresponding to any one of two points of the shortest distance and the acquired visual frame, and calculates a position of the robot.

20. The robot of claim 19, wherein the controller applies accuracy of the LiDAR sensor or accuracy of the camera sensor to the comparison of similarities.

\* \* \* \* \*